(12) United States Patent
Ouweleen et al.

(10) Patent No.: US 11,724,220 B2
(45) Date of Patent: Aug. 15, 2023

(54) UNDULATED INTERLOCKING HOUSING-ENDPLATE INTERFACE GEOMETRY

(71) Applicant: CUMMINS FILTRATION IP, INC., Columbus, IN (US)

(72) Inventors: Philip M. Ouweleen, Cookeville, TN (US); Zemin Jiang, Cookeville, TN (US); Ted S. Loftis, Cookeville, TN (US); Karthik Kothakota, Cookeville, TN (US); Mano Raj Sekar, Columbus, IN (US); Mark J. Johnson, Cookeville, IN (US); Aaron M. Wells, Cookeville, TN (US); Robert A. Bannister, Ames, IA (US); Joshua Crooks, Cookeville, TN (US); Brian M. Palmer, Cookeville, TN (US); Sean M. Grabein, Rock Island, TN (US); Connor D. Oren, Cookeville, TN (US)

(73) Assignee: CUMMINS FILTRATION IP, INC., Columbus, IN (US)

( * ) Notice: Subject to any disclaimer, the term of this patent is extended or adjusted under 35 U.S.C. 154(b) by 108 days.

(21) Appl. No.: 16/487,209

(22) PCT Filed: Feb. 20, 2018

(86) PCT No.: PCT/US2018/018724
§ 371 (c)(1),
(2) Date: Aug. 20, 2019

(87) PCT Pub. No.: WO2018/156489
PCT Pub. Date: Aug. 30, 2018

(65) Prior Publication Data
US 2020/0384395 A1 Dec. 10, 2020

Related U.S. Application Data

(60) Provisional application No. 62/461,497, filed on Feb. 21, 2017.

(51) Int. Cl.
*B01D 35/30* (2006.01)
*B01D 29/15* (2006.01)
(Continued)

(52) U.S. Cl.
CPC ............ *B01D 35/30* (2013.01); *B01D 29/15* (2013.01); *B01D 46/009* (2013.01);
(Continued)

(58) Field of Classification Search
CPC .......... B01D 46/2414; B01D 2201/295; B01D 2201/4053; B01D 2201/4046;
(Continued)

(56) References Cited

U.S. PATENT DOCUMENTS 2,025,009 A 12/1935 Baker
2,093,877 A 9/1937 Von Pentz
(Continued)

FOREIGN PATENT DOCUMENTS

CN 1130539 A 9/1996
CN 1139884 1/1997
(Continued)

OTHER PUBLICATIONS

First Office Action issue for U.S. Appl. No. 6/478092, dated Aug. 18, 20202, 24 pages.
(Continued)

*Primary Examiner* — Benjamin M Kurtz
(74) *Attorney, Agent, or Firm* — Foley & Lardner LLP

(57) ABSTRACT

A filtration system having an undulated interlocking housing-endplate interface geometry is described. In the filtration system, a filter element endplate and a filter housing component (e.g., a shell housing, a filter mounting head, etc.) meet at an interface. The filter housing component includes an undulating or repeating pattern that meshes with a matching undulating or repeating pattern on the endplate of
(Continued)

the filter element. The undulating or repeating pattern prevents the filter element from freely rotating with respect to the filter housing component of the filtration system.

13 Claims, 24 Drawing Sheets

(51) Int. Cl.
    *B01D 46/00*         (2022.01)
    *B01D 46/24*         (2006.01)

(52) U.S. Cl.
    CPC .... *B01D 46/2414* (2013.01); *B01D 2201/295* (2013.01); *B01D 2201/4053* (2013.01); *B01D 2201/4076* (2013.01); *B01D 2201/4092* (2013.01); *B01D 2201/52* (2013.01); *B01D 2265/021* (2013.01); *B01D 2265/026* (2013.01)

(58) Field of Classification Search
    CPC ...... B01D 2201/4076; B01D 2265/021; B01D 2265/026
    See application file for complete search history.

(56) References Cited

U.S. PATENT DOCUMENTS

| | | |
|---|---|---|
| 2,270,969 A | 1/1942 | Robinson |
| 2,306,325 A | 12/1942 | Sidney |
| 2,559,267 A | 7/1951 | Winslow et al. |
| 2,910,332 A | 10/1959 | Madsen |
| 2,915,188 A | 12/1959 | Buker |
| 2,955,028 A | 10/1960 | Bevans |
| 3,025,963 A | 3/1962 | Bauer |
| 3,224,592 A | 12/1965 | Burns et al. |
| 3,383,841 A | 5/1968 | Olson |
| 3,384,241 A | 5/1968 | Nostrand et al. |
| 3,494,113 A | 2/1970 | Kinney |
| 3,576,095 A | 4/1971 | Rivers |
| 3,582,095 A | 6/1971 | Bogaert |
| 3,598,738 A | 8/1971 | Du Pont |
| 3,645,402 A | 2/1972 | Alexander et al. |
| 3,687,849 A | 8/1972 | Abbott |
| 3,749,247 A | 7/1973 | Rohde |
| 4,014,794 A | 3/1977 | Lewis |
| 4,061,572 A | 12/1977 | Cohen et al. |
| 4,066,559 A | 1/1978 | Rohde |
| 4,075,097 A | 2/1978 | Paul |
| 4,075,098 A | 2/1978 | Paul et al. |
| 4,080,185 A | 3/1978 | Richter et al. |
| 4,128,251 A | 12/1978 | Gaither et al. |
| 4,129,429 A | 12/1978 | Humbert et al. |
| 4,144,169 A | 3/1979 | Grueschow |
| 4,181,313 A | 1/1980 | Hillier et al. |
| 4,211,543 A | 7/1980 | Tokar et al. |
| 4,257,890 A | 3/1981 | Hurner |
| 4,300,928 A | 11/1981 | Sugie |
| 4,324,213 A | 4/1982 | Kasting et al. |
| 4,364,751 A | 12/1982 | Copley |
| 4,402,912 A | 9/1983 | Krueger et al. |
| 4,410,427 A | 10/1983 | Wydeven |
| 4,473,471 A | 9/1984 | Robichaud et al. |
| 4,572,522 A | 2/1986 | Smagatz |
| 4,589,983 A | 5/1986 | Wydevan |
| 4,600,420 A | 7/1986 | Wydeven et al. |
| 4,617,122 A | 10/1986 | Kruse et al. |
| 4,738,776 A | 4/1988 | Brown |
| 4,755,289 A | 7/1988 | Villani |
| 4,782,891 A | 11/1988 | Cheadle et al. |
| 4,826,517 A | 5/1989 | Norman |
| 4,861,359 A | 8/1989 | Tettman |
| 4,865,636 A | 9/1989 | Raber |
| 4,915,831 A | 4/1990 | Taylor |
| 4,925,561 A | 5/1990 | Ishii et al. |
| 4,951,834 A | 8/1990 | Aikins |
| 4,979,969 A | 12/1990 | Herding |
| 5,024,268 A | 6/1991 | Cheadle et al. |
| 5,050,549 A | 9/1991 | Sturmon |
| 5,069,799 A | 12/1991 | Brownawell et al. |
| 5,071,456 A | 12/1991 | Binder et al. |
| 5,094,745 A | 3/1992 | Reynolds |
| 5,120,334 A | 6/1992 | Cooper |
| 5,171,430 A * | 12/1992 | Beach .................... B01D 35/30 |
| | | 210/DIG. 17 |
| 5,203,994 A | 4/1993 | Janik |
| 5,213,596 A | 5/1993 | Kume et al. |
| 5,222,488 A | 6/1993 | Forsgren |
| 5,223,011 A | 6/1993 | Hanni |
| 5,225,081 A | 7/1993 | Brownawell |
| 5,228,891 A | 7/1993 | Adiletta |
| 5,258,118 A | 11/1993 | Gouritin et al. |
| 5,298,160 A | 3/1994 | Ayers et al. |
| 5,302,284 A | 4/1994 | Zeiner et al. |
| 5,342,511 A | 8/1994 | Brown et al. |
| 5,382,355 A | 1/1995 | Arlozynski |
| 5,391,212 A | 2/1995 | Ernst et al. |
| 5,435,346 A | 7/1995 | Tregidgo et al. |
| 5,459,074 A | 10/1995 | Muoni |
| 5,472,379 A | 12/1995 | Andress et al. |
| 5,472,463 A | 12/1995 | Herman et al. |
| 5,484,466 A | 1/1996 | Brown et al. |
| 5,494,497 A | 2/1996 | Lee |
| 5,498,332 A | 3/1996 | Handtmann |
| 5,512,074 A | 4/1996 | Hanni et al. |
| 5,531,848 A | 7/1996 | Brinda et al. |
| 5,556,542 A | 9/1996 | Berman et al. |
| 5,560,330 A | 10/1996 | Andress et al. |
| 5,562,825 A | 10/1996 | Yamada et al. |
| 5,569,311 A | 10/1996 | Oda et al. |
| 5,575,826 A | 11/1996 | Gillingham et al. |
| 5,591,330 A | 1/1997 | Lefebvre |
| 5,605,554 A | 2/1997 | Kennedy |
| 5,662,799 A | 9/1997 | Hudgens et al. |
| 5,672,399 A | 9/1997 | Kahlbaugh et al. |
| 5,709,722 A | 1/1998 | Nagai et al. |
| 5,720,790 A | 2/1998 | Kometani et al. |
| 5,738,785 A | 4/1998 | Brown et al. |
| 5,753,116 A | 5/1998 | Baumann et al. |
| 5,753,117 A | 5/1998 | Jiang |
| 5,753,120 A * | 5/1998 | Clausen ................. B01D 35/30 |
| | | 210/450 |
| 5,759,217 A | 6/1998 | Joy |
| 5,772,883 A | 6/1998 | Rothman et al. |
| 5,793,566 A | 8/1998 | Scura et al. |
| 5,795,361 A | 8/1998 | Lanier et al. |
| 5,803,024 A | 9/1998 | Brown |
| 5,820,646 A | 10/1998 | Gillingham et al. |
| 5,830,371 A | 11/1998 | Smith et al. |
| 5,853,439 A | 12/1998 | Gieseke et al. |
| 5,855,772 A | 1/1999 | Miller et al. |
| 5,863,424 A | 1/1999 | Lee |
| 5,891,402 A | 4/1999 | Sassa et al. |
| 5,893,939 A | 4/1999 | Rakocy et al. |
| 5,902,364 A | 5/1999 | Tokar et al. |
| 5,948,248 A | 9/1999 | Brown |
| 5,985,143 A | 11/1999 | Lin |
| 6,045,692 A | 4/2000 | Bilski et al. |
| D425,189 S | 5/2000 | Gillingham et al. |
| 6,086,763 A | 7/2000 | Baumann |
| 6,096,208 A | 8/2000 | Connelly et al. |
| 6,098,575 A | 8/2000 | Mulshine et al. |
| 6,099,612 A | 8/2000 | Bartos |
| 6,117,202 A | 9/2000 | Wetzel |
| 6,123,746 A | 9/2000 | Alvin et al. |
| 6,129,852 A | 10/2000 | Elliott et al. |
| 6,149,700 A | 11/2000 | Morgan et al. |
| 6,171,355 B1 | 1/2001 | Gieseke et al. |
| 6,179,890 B1 | 1/2001 | Ramos et al. |
| D437,402 S | 2/2001 | Gieseke et al. |
| 6,190,432 B1 | 2/2001 | Gieseke et al. |
| 6,196,019 B1 | 3/2001 | Higo et al. |
| 6,217,627 B1 | 4/2001 | Vyskocil et al. |
| 6,231,630 B1 | 5/2001 | Ernst et al. |
| 6,235,194 B1 | 5/2001 | Jousset |

(56) References Cited

U.S. PATENT DOCUMENTS

| | | |
|---|---|---|
| 6,235,195 B1 | 5/2001 | Tokar |
| 6,238,554 B1 | 5/2001 | Martin et al. |
| 6,238,561 B1 | 5/2001 | Liu et al. |
| 6,261,334 B1 | 7/2001 | Morgan et al. |
| 6,264,831 B1 | 7/2001 | Hawkins et al. |
| 6,264,833 B1 | 7/2001 | Reamsnyder et al. |
| RE37,369 E | 9/2001 | Hudgens et al. |
| 6,293,984 B1 | 9/2001 | Oda et al. |
| 6,306,193 B1 | 10/2001 | Morgan et al. |
| D450,828 S | 11/2001 | Tokar |
| 6,322,697 B1 | 11/2001 | Hacker et al. |
| 6,348,085 B1 | 2/2002 | Tokar et al. |
| D455,826 S | 4/2002 | Gillingham et al. |
| 6,375,700 B1 | 4/2002 | Jaroszczyk et al. |
| 6,379,564 B1 | 4/2002 | Rohrbach et al. |
| 6,391,076 B1 | 5/2002 | Jaroszczyk et al. |
| 6,398,832 B2 | 6/2002 | Morgan et al. |
| 6,402,798 B1 | 6/2002 | Kallsen et al. |
| 6,416,561 B1 | 7/2002 | Kallsen et al. |
| 6,447,566 B1 | 9/2002 | Rivera et al. |
| 6,475,379 B2 | 11/2002 | Jousset et al. |
| 6,478,019 B2 | 11/2002 | Fedorowicz et al. |
| 6,478,958 B1 | 11/2002 | Beard et al. |
| 6,482,247 B2 | 11/2002 | Jaroszczyk et al. |
| 6,511,599 B2 | 1/2003 | Jaroszczyk et al. |
| 6,517,598 B2 | 2/2003 | Anderson et al. |
| 6,537,453 B2 | 3/2003 | Beard et al. |
| D473,637 S | 4/2003 | Golden |
| 6,547,857 B2 | 4/2003 | Gieseke et al. |
| 6,554,139 B1 | 4/2003 | Maxwell et al. |
| 6,571,962 B2 | 6/2003 | Thomas |
| 6,596,165 B2 | 7/2003 | Koivula |
| 6,610,126 B2 | 8/2003 | Xu et al. |
| 6,623,636 B2 | 9/2003 | Rohrbach et al. |
| 6,641,637 B2 | 11/2003 | Kallsen et al. |
| 6,673,136 B2 | 1/2004 | Gillingham et al. |
| 6,676,721 B1 | 1/2004 | Gillingham et al. |
| 6,709,588 B2 | 3/2004 | Pavlin et al. |
| 6,740,234 B1 | 5/2004 | Williams et al. |
| 6,743,317 B2 | 6/2004 | Wydeven |
| 6,746,518 B2 | 6/2004 | Gieseke et al. |
| 6,787,033 B2 | 9/2004 | Beard et al. |
| 6,823,996 B2 | 11/2004 | Durre |
| 6,827,750 B2 | 12/2004 | Drozd et al. |
| 6,835,304 B2 | 12/2004 | Jousset et al. |
| 6,837,920 B2 | 1/2005 | Gieseke et al. |
| 6,843,916 B2 | 1/2005 | Burrington et al. |
| 6,860,241 B2 | 3/2005 | Martin et al. |
| 6,893,571 B2 | 5/2005 | Harenbrock et al. |
| 6,902,598 B2 | 6/2005 | Gunderson et al. |
| 6,919,023 B2 | 7/2005 | Merritt et al. |
| 6,922,894 B2 | 8/2005 | Durre |
| 6,939,464 B1 | 9/2005 | Jiang et al. |
| 6,953,124 B2 | 10/2005 | Winter et al. |
| 6,966,940 B2 | 11/2005 | Krisko et al. |
| 6,969,461 B2 | 11/2005 | Beard et al. |
| 6,984,319 B2 | 1/2006 | Merritt et al. |
| 6,996,940 B2 | 2/2006 | Beasley |
| 6,998,045 B2 | 2/2006 | Durre |
| 7,001,450 B2 | 2/2006 | Gieseke et al. |
| 7,008,467 B2 | 3/2006 | Krisko et al. |
| 7,018,531 B2 | 3/2006 | Eilers et al. |
| 7,048,501 B2 | 5/2006 | Katayama et al. |
| 7,070,641 B1 | 7/2006 | Gunderson et al. |
| 7,081,145 B2 | 7/2006 | Gieseke et al. |
| 7,090,711 B2 | 8/2006 | Gillingham et al. |
| 7,153,422 B2 | 12/2006 | Herman et al. |
| 7,156,991 B2 | 1/2007 | Herman et al. |
| 7,160,451 B2 | 1/2007 | Hacker et al. |
| 7,182,863 B2 | 2/2007 | Eilers et al. |
| 7,182,864 B2 | 2/2007 | Brown et al. |
| 7,211,124 B2 | 5/2007 | Gieseke |
| 7,217,361 B2 | 5/2007 | Connor et al. |
| 7,237,682 B2 | 7/2007 | Reynolds et al. |
| 7,247,183 B2 | 7/2007 | Connor et al. |
| 7,258,719 B2 | 8/2007 | Miller et al. |
| 7,282,075 B2 | 10/2007 | Sporre et al. |
| 7,311,747 B2 | 12/2007 | Adamek et al. |
| 7,338,544 B2 | 3/2008 | Sporre et al. |
| 7,344,582 B2 | 3/2008 | Pearson et al. |
| 7,351,270 B2 | 4/2008 | Engelland et al. |
| 7,396,375 B2 | 7/2008 | Nepsund et al. |
| 7,425,226 B2 | 9/2008 | Powell |
| 7,435,341 B2 * | 10/2008 | Crawford ............ B01D 35/147 |
| | | 210/DIG. 17 |
| 7,491,254 B2 | 2/2009 | Krisko et al. |
| 7,494,017 B2 | 2/2009 | Miller |
| 7,524,416 B1 | 4/2009 | Bergmen |
| 7,540,895 B2 | 6/2009 | Furseth et al. |
| D600,790 S | 9/2009 | Nelson et al. |
| 7,582,130 B2 | 9/2009 | Ng et al. |
| 7,614,504 B2 | 11/2009 | South et al. |
| 7,625,419 B2 | 12/2009 | Nelson et al. |
| 7,645,310 B2 | 1/2010 | Krisko et al. |
| 7,655,074 B2 | 2/2010 | Nepsund et al. |
| 7,662,216 B1 | 2/2010 | Terres et al. |
| 7,674,308 B2 | 3/2010 | Krisko et al. |
| 7,682,416 B2 | 3/2010 | Engelland et al. |
| 7,731,753 B2 | 6/2010 | Reo et al. |
| 7,776,139 B2 | 8/2010 | Schwandt et al. |
| 7,799,108 B2 | 9/2010 | Connor et al. |
| 7,828,869 B1 | 11/2010 | Parikh et al. |
| 7,882,961 B2 | 2/2011 | Menez et al. |
| 7,931,723 B2 | 4/2011 | Cuvelier |
| 7,959,714 B2 | 6/2011 | Smith et al. |
| 7,967,886 B2 | 6/2011 | Schrage et al. |
| 7,972,405 B2 | 7/2011 | Engelland et al. |
| 7,981,183 B2 | 7/2011 | Nepsund et al. |
| 7,993,422 B2 | 8/2011 | Krisko et al. |
| 8,016,903 B2 | 9/2011 | Nelson et al. |
| 8,034,145 B2 | 10/2011 | Boehrs et al. |
| 8,043,504 B2 | 10/2011 | Malgorn |
| 8,048,187 B2 | 11/2011 | Merritt et al. |
| 8,061,530 B2 | 11/2011 | Kindkeppel et al. |
| 8,062,399 B2 | 11/2011 | Nelson et al. |
| 8,096,423 B2 | 1/2012 | Menez et al. |
| 8,097,061 B2 | 1/2012 | Smith et al. |
| 8,101,003 B2 | 1/2012 | Krisko et al. |
| 8,119,002 B2 | 2/2012 | Schiavon et al. |
| 8,146,751 B2 | 4/2012 | Hawkins et al. |
| 8,167,966 B2 | 5/2012 | Amirkhanian et al. |
| 8,177,967 B2 | 5/2012 | Bagci et al. |
| 8,216,470 B2 | 7/2012 | Abdalla et al. |
| 8,220,640 B2 | 7/2012 | Schmitz et al. |
| 8,241,383 B2 | 8/2012 | Schrage et al. |
| 8,276,763 B2 | 10/2012 | Shaam |
| 8,277,532 B2 | 10/2012 | Reichter et al. |
| 8,292,983 B2 | 10/2012 | Reichter et al. |
| 8,328,897 B2 | 12/2012 | Nelson et al. |
| 8,333,890 B2 | 12/2012 | Wells et al. |
| 8,348,064 B2 | 1/2013 | Tandon |
| 8,357,219 B2 | 1/2013 | Boehrs et al. |
| 8,419,938 B2 | 4/2013 | Ries et al. |
| 8,430,657 B2 | 4/2013 | Simonelli et al. |
| 8,440,081 B2 | 5/2013 | Wieczorek |
| 8,480,779 B2 | 7/2013 | Boehrs et al. |
| 8,496,723 B2 | 7/2013 | Reichter et al. |
| 8,501,001 B2 | 8/2013 | Curt et al. |
| 8,506,666 B2 | 8/2013 | Haslebacher |
| 8,518,141 B2 | 8/2013 | Schrage et al. |
| 8,544,158 B2 | 10/2013 | Curt et al. |
| 8,550,656 B2 | 10/2013 | Mccarthy et al. |
| 8,562,707 B2 | 10/2013 | Nepsund et al. |
| 8,636,820 B2 | 1/2014 | Reichter et al. |
| 8,652,228 B2 | 2/2014 | Krisko et al. |
| 8,709,119 B2 | 4/2014 | Reichter et al. |
| 8,714,565 B1 | 5/2014 | Cornett et al. |
| 8,753,414 B2 | 6/2014 | Gebert |
| 8,778,043 B2 | 7/2014 | Krisko et al. |
| 8,840,699 B2 | 9/2014 | Bruce et al. |
| 8,845,897 B2 | 9/2014 | Wieczorek et al. |
| 8,852,308 B2 | 10/2014 | Jarrier |
| 8,906,128 B2 | 12/2014 | Reichter et al. |
| 8,911,498 B2 | 12/2014 | Bartish et al. |

(56) References Cited

U.S. PATENT DOCUMENTS

| | | |
|---|---|---|
| 8,926,725 B2 | 1/2015 | Loken et al. |
| 8,932,465 B2 | 1/2015 | Wells et al. |
| 9,101,883 B2 | 8/2015 | Pugh et al. |
| 9,114,346 B2 | 8/2015 | Schrage et al. |
| 9,211,488 B2 | 12/2015 | South et al. |
| 9,308,476 B2 | 4/2016 | Martin et al. |
| 9,308,482 B2 | 4/2016 | Kaiser |
| 9,320,997 B2 | 4/2016 | Campbell et al. |
| 9,409,107 B2 | 8/2016 | Arakeri et al. |
| 9,415,333 B2 | 8/2016 | Kindkeppel et al. |
| 9,500,167 B2 | 11/2016 | Verdegan et al. |
| 9,782,706 B1 | 10/2017 | Levy |
| 9,782,708 B2 | 10/2017 | Kindkeppel et al. |
| 10,279,424 B2 | 5/2019 | Sudermann et al. |
| 10,300,417 B2 | 5/2019 | Wuebbeling |
| 10,316,804 B2 | 6/2019 | Hasenfratz et al. |
| 10,343,099 B2 | 7/2019 | Kaiser |
| 10,556,200 B2 | 2/2020 | Dirnberger et al. |
| 10,662,905 B2 | 5/2020 | Dirnberger et al. |
| 10,729,999 B2 | 8/2020 | Nichols et al. |
| 10,744,443 B2 | 8/2020 | Silvestro |
| 10,835,852 B2 | 11/2020 | Decoster et al. |
| 2001/0032545 A1 | 10/2001 | Goto et al. |
| 2002/0046556 A1 | 4/2002 | Reid |
| 2002/0060178 A1 | 5/2002 | Tsabari |
| 2002/0073850 A1 | 6/2002 | Tokar et al. |
| 2002/0096247 A1 | 7/2002 | Wydeven |
| 2002/0157359 A1 | 10/2002 | Stenersen et al. |
| 2002/0158006 A1 | 10/2002 | Thomas |
| 2002/0170280 A1 | 11/2002 | Soh |
| 2002/0185007 A1 | 12/2002 | Xu et al. |
| 2002/0185454 A1 | 12/2002 | Beard et al. |
| 2002/0195384 A1 | 12/2002 | Rohrbach et al. |
| 2003/0121845 A1 | 7/2003 | Wagner et al. |
| 2003/0154863 A1 | 8/2003 | Tokar et al. |
| 2003/0184025 A1 | 10/2003 | Matsuki |
| 2003/0218150 A1 | 11/2003 | Blakemore et al. |
| 2004/0031745 A1 | 2/2004 | Moessinger et al. |
| 2004/0035097 A1 | 2/2004 | Schlensker et al. |
| 2004/0040271 A1 | 3/2004 | Kopec et al. |
| 2004/0060861 A1 | 4/2004 | Winter et al. |
| 2004/0091652 A1 | 5/2004 | Kikuchi et al. |
| 2004/0091654 A1 | 5/2004 | Kelly et al. |
| 2004/0140255 A1 | 7/2004 | Merritt et al. |
| 2004/0173097 A1 | 9/2004 | Engelland et al. |
| 2004/0187689 A1 | 9/2004 | Sporre et al. |
| 2004/0221555 A1 | 11/2004 | Engelland et al. |
| 2004/0226443 A1 | 11/2004 | Gillingham et al. |
| 2005/0019236 A1 | 1/2005 | Martin et al. |
| 2005/0024061 A1 | 2/2005 | Cox et al. |
| 2005/0166561 A1 | 8/2005 | Schrage et al. |
| 2005/0173325 A1 | 8/2005 | Klein et al. |
| 2005/0178706 A1 | 8/2005 | Bagei |
| 2005/0178714 A1 | 8/2005 | Stockbower |
| 2005/0193695 A1 | 9/2005 | Holmes et al. |
| 2005/0194312 A1 | 9/2005 | Niemeyer et al. |
| 2005/0224061 A1 | 10/2005 | Ulrich et al. |
| 2005/0252848 A1 | 11/2005 | Miller |
| 2006/0064956 A1 | 3/2006 | Connor et al. |
| 2006/0113233 A1 | 6/2006 | Merritt et al. |
| 2006/0118474 A1 | 6/2006 | Kolczyk et al. |
| 2006/0180537 A1 | 8/2006 | Loftis et al. |
| 2006/0213139 A1 | 9/2006 | Stramandinoli |
| 2006/0219626 A1 | 10/2006 | Dworatzek et al. |
| 2007/0037428 A1 | 2/2007 | Annecke |
| 2007/0095744 A1 | 5/2007 | Bagci et al. |
| 2007/0175815 A1 | 8/2007 | Thomas |
| 2007/0240392 A1 | 10/2007 | Ng et al. |
| 2007/0261374 A1 | 11/2007 | Nelson et al. |
| 2007/0267338 A1 | 11/2007 | Menez et al. |
| 2008/0011672 A1 | 1/2008 | Schwartz et al. |
| 2008/0022641 A1 | 1/2008 | Engelland et al. |
| 2008/0035587 A1 | 2/2008 | Wieczorek et al. |
| 2008/0047132 A1 | 2/2008 | Wieczorek |
| 2008/0087589 A1 | 4/2008 | Grzonka et al. |
| 2008/0107765 A1 | 5/2008 | Considine et al. |
| 2008/0110142 A1 | 5/2008 | Nelson et al. |
| 2008/0179263 A1 | 7/2008 | Wieczorek et al. |
| 2008/0237113 A1 | 10/2008 | Jensen |
| 2008/0250766 A1 | 10/2008 | Schrage et al. |
| 2008/0307759 A1 | 12/2008 | Reichter et al. |
| 2008/0308481 A1 | 12/2008 | Wieczorek et al. |
| 2009/0014381 A1 | 1/2009 | South et al. |
| 2009/0026124 A1 | 1/2009 | Schmitz et al. |
| 2009/0050554 A1 | 2/2009 | Shaam |
| 2009/0057213 A1 | 3/2009 | Schiavon et al. |
| 2009/0057219 A1 | 3/2009 | Bagci et al. |
| 2009/0064646 A1 | 3/2009 | Reichter et al. |
| 2009/0071892 A1 | 3/2009 | Malgorn |
| 2009/0090669 A1 | 4/2009 | Holzmann et al. |
| 2009/0095669 A1 | 4/2009 | South |
| 2009/0126324 A1 | 5/2009 | Smith et al. |
| 2009/0127198 A1 | 5/2009 | Salvador et al. |
| 2009/0135590 A1 | 5/2009 | Mccarthy et al. |
| 2009/0151311 A1 | 6/2009 | Reichter et al. |
| 2009/0193972 A1 | 8/2009 | Schwandt et al. |
| 2009/0241315 A1 | 10/2009 | Menez et al. |
| 2009/0242475 A2 | 10/2009 | Menez et al. |
| 2009/0249754 A1 | 10/2009 | Amirkhanian et al. |
| 2009/0326657 A1 | 12/2009 | Grinberg et al. |
| 2010/0001477 A1 | 1/2010 | Eyers et al. |
| 2010/0043366 A1 | 2/2010 | Boehrs et al. |
| 2010/0051528 A1 | 3/2010 | Derstler et al. |
| 2010/0064646 A1 | 3/2010 | Smith et al. |
| 2010/0065203 A1 | 3/2010 | Tanbour et al. |
| 2010/0077710 A1 | 4/2010 | Severance et al. |
| 2010/0101993 A1* | 4/2010 | Wells .................. B01D 36/006 210/455 |
| 2010/0108590 A1 | 5/2010 | Curt et al. |
| 2010/0114318 A1 | 5/2010 | Gittings et al. |
| 2010/0126919 A1 | 5/2010 | Hawkins et al. |
| 2010/0150764 A1 | 6/2010 | Simonelli et al. |
| 2010/0170209 A1 | 7/2010 | Nelson et al. |
| 2010/0176047 A1 | 7/2010 | Bagci et al. |
| 2010/0186353 A1 | 7/2010 | Ackermann et al. |
| 2010/0200490 A1 | 8/2010 | Martin et al. |
| 2010/0229513 A1 | 9/2010 | Eisengraeber-Pabst et al. |
| 2010/0258493 A1 | 10/2010 | Kindkeppel et al. |
| 2010/0263339 A1 | 10/2010 | Steins et al. |
| 2010/0294707 A1 | 11/2010 | Abdalla et al. |
| 2010/0294712 A1 | 11/2010 | Abdalla et al. |
| 2011/0089104 A1 | 4/2011 | Menez et al. |
| 2011/0132829 A1 | 6/2011 | Tucker et al. |
| 2011/0197556 A1 | 8/2011 | Brown et al. |
| 2011/0203099 A1 | 8/2011 | Curt et al. |
| 2011/0260413 A1 | 10/2011 | Voltenburg et al. |
| 2011/0303604 A1 | 12/2011 | Mckenzie |
| 2012/0031059 A1 | 2/2012 | Haslebacher |
| 2012/0055127 A1 | 3/2012 | Holzmann et al. |
| 2012/0061307 A1 | 3/2012 | Kindkeppel et al. |
| 2012/0223008 A1 | 9/2012 | Mbadinga-Mouanda et al. |
| 2013/0015119 A1 | 1/2013 | Pugh et al. |
| 2013/0033006 A1 | 2/2013 | Salvador et al. |
| 2013/0087497 A1 | 4/2013 | Wells et al. |
| 2013/0220914 A1 | 8/2013 | Hawkins et al. |
| 2013/0291502 A1 | 11/2013 | Gorman |
| 2013/0327696 A1 | 12/2013 | Bagci et al. |
| 2014/0027366 A1 | 1/2014 | Hawkins et al. |
| 2014/0034565 A1 | 2/2014 | Loken et al. |
| 2014/0034566 A1 | 2/2014 | Verdegan et al. |
| 2014/0048468 A1 | 2/2014 | Kindkeppel et al. |
| 2014/0071669 A1 | 3/2014 | Mccarthy et al. |
| 2014/0096493 A1 | 4/2014 | Kelmartin et al. |
| 2014/0151275 A1 | 6/2014 | Bradford et al. |
| 2014/0190880 A1* | 7/2014 | Krull .................. B01D 29/114 210/236 |
| 2014/0251895 A1 | 9/2014 | Wagner |
| 2014/0260143 A1 | 9/2014 | Kaiser |
| 2014/0290194 A1 | 10/2014 | Muenkel et al. |
| 2014/0318090 A1 | 10/2014 | Rieger et al. |
| 2015/0013288 A1 | 1/2015 | Hasenfratz et al. |
| 2015/0013289 A1 | 1/2015 | Hasenfratz et al. |
| 2015/0013293 A1 | 1/2015 | Wagner et al. |
| 2015/0033684 A1 | 2/2015 | Pettersson |

(56) References Cited

U.S. PATENT DOCUMENTS

| | | |
|---|---|---|
| 2015/0060351 A1 | 3/2015 | Kaufmann et al. |
| 2015/0061307 A1 | 3/2015 | Nakanishi |
| 2015/0090651 A1 | 4/2015 | Kotale et al. |
| 2015/0090656 A1 | 4/2015 | Mandt et al. |
| 2015/0096273 A1 | 4/2015 | Kaiser |
| 2015/0096932 A1 | 4/2015 | Hou et al. |
| 2015/0101295 A1 | 4/2015 | Thompson et al. |
| 2015/0176544 A1 | 6/2015 | Kaufmann et al. |
| 2015/0202556 A1 | 7/2015 | Hawkins et al. |
| 2015/0231532 A1 | 8/2015 | Pugh et al. |
| 2015/0285381 A1 | 10/2015 | Preston et al. |
| 2016/0023142 A1 | 1/2016 | Arakeri et al. |
| 2016/0045848 A1 | 2/2016 | Campbell et al. |
| 2016/0059172 A1 | 3/2016 | Allott et al. |
| 2016/0082372 A1 | 3/2016 | South et al. |
| 2016/0160816 A1 | 6/2016 | Venkatraman et al. |
| 2016/0169391 A1 | 6/2016 | Emig et al. |
| 2016/0222931 A1 | 8/2016 | Jiang et al. |
| 2016/0228798 A1 | 8/2016 | Page et al. |
| 2016/0258397 A1 | 9/2016 | Jiang et al. |
| 2016/0332098 A1 | 11/2016 | Chavan et al. |
| 2016/0332103 A1 | 11/2016 | Marks et al. |
| 2017/0078852 A1 | 3/2017 | Tan et al. |
| 2018/0318745 A1 | 11/2018 | Nichols et al. |
| 2020/0324237 A1 | 10/2020 | Moers et al. |

FOREIGN PATENT DOCUMENTS

| | | |
|---|---|---|
| CN | 1193288 A | 9/1998 |
| CN | 2296402 Y | 11/1998 |
| CN | 1486213 A | 3/2004 |
| CN | 1590746 B | 3/2005 |
| CN | 2372041 Y | 4/2005 |
| CN | 1754612 A | 4/2006 |
| CN | 101084050 A | 12/2007 |
| CN | 101374582 A | 2/2009 |
| CN | 201292900 Y | 8/2009 |
| CN | 101695616 A | 4/2010 |
| CN | 201696412 U | 1/2011 |
| CN | 102046259 A | 5/2011 |
| CN | 102083510 A | 6/2011 |
| CN | 202040173 U | 11/2011 |
| CN | 102271780 A | 12/2011 |
| CN | 202746046 U | 2/2013 |
| CN | 103501873 A | 1/2014 |
| CN | 103977647 A | 8/2014 |
| CN | 104220142 A | 12/2014 |
| CN | 105688498 A | 6/2016 |
| CN | 105899271 A | 8/2016 |
| CN | 106102858 A | 11/2016 |
| DE | 88 08 632 U1 | 9/1988 |
| DE | 29613098 U1 | 9/1996 |
| DE | 10 2008 062 956 A1 | 6/2010 |
| EP | 0 718 021 A1 | 6/1996 |
| EP | 0 747 579 A2 | 12/1996 |
| EP | 0 982 062 A2 | 3/2000 |
| EP | 1 129 760 A2 | 9/2001 |
| EP | 1 166 843 A1 | 1/2002 |
| EP | 1 208 902 A1 | 5/2002 |
| EP | 1 233 173 A2 | 8/2002 |
| EP | 1 693 096 A2 | 8/2006 |
| EP | 1 693 096 B1 | 8/2006 |
| EP | 1 747 053 A1 | 1/2007 |
| EP | 3 370 849 A1 | 9/2018 |
| FR | 2214505 A1 | 8/1974 |
| GB | 0 970 826 A | 9/1964 |
| GB | 2 082 932 A | 3/1982 |
| GB | 2 404 348 A | 2/2005 |
| JP | 60-112320 A | 6/1985 |
| JP | 01-163408 A | 6/1989 |
| JP | 01-171615 A | 7/1989 |
| JP | 02-025009 A | 1/1990 |
| WO | WO-00/50152 A1 | 8/2000 |
| WO | WO-00/74818 A1 | 12/2000 |
| WO | WO-01/05485 A1 | 1/2001 |
| WO | WO-2004/054684 A1 | 7/2004 |
| WO | WO-2005/058461 A1 | 6/2005 |
| WO | WO-2005/077487 A1 | 8/2005 |
| WO | WO-2006/093981 A2 | 9/2006 |
| WO | WO-2007/009039 A1 | 1/2007 |
| WO | WO-2007/089662 A2 | 8/2007 |
| WO | WO-2012/153430 A1 | 11/2012 |
| WO | WO-2017/079191 A1 | 5/2017 |
| WO | WO-2017/120113 | 7/2017 |
| WO | WO-2018/075063 A1 | 4/2018 |
| WO | WO-2018/156489 A1 | 8/2018 |

OTHER PUBLICATIONS

International Search Report on PCT/IB2019/056208 dated Nov. 21, 2019.
U.S. Office Action on U.S. Appl. No. 16/478,092 dated Feb. 9, 2021.
Akro-Mils, "Nest & Stack Totes," retrieved from http://web.archive.org/web/20150323114331/https://akro-mils.com/produts/types/plastic-storage-containers/nest-stack-totes, 1 page (2015).
First Examination Report for Indian Patent App. No. 202047056950 dated Mar. 24, 2021, 5 pages.
First Examination Report for Indian Patent App. No. 3035/KOLNP/2011, dated Feb. 8, 2019, 7 pages.
First Office Action for Chinese Patent App. No. 201080004417.5, dated May 24, 2013, 13 pages (with translation).
First Office Action for Chinese Patent App. No. 2016800710703 dated Nov. 26, 2019, 29 pages (with translation).
First Office Action for Chinese Patent Application No. 201880007980.4 dated Jan. 12, 2021, 15 pages (with English translation).
First Office Action issued for Chinese Patent App. No. 201880018033.5 dated Dec. 24, 2020, 10 pages (with English translation).
International Search Report and Written Opinion for PCT/US2016/063053, dated Feb. 16, 2017, 8 pages.
International Search Report and Written Opinion for PCT/US2017/021615, dated Jun. 6, 2017, 8 pages.
International Search Report and Written Opinion for PCT/US2017/030386, dated Jul. 26, 2017, 9 pages.
International Search Report and Written Opinion for PCT/US2018/018696, dated Apr. 19, 2018, 8 pages.
Office Action for German Patent App. No. 11 2010 001 567.8 dated May 18, 2017, 12 pages (with translation).
Second Office Action for Chinese Patent App. No. 201080004417.5, dated Mar. 5, 2014, 28 pages (with translation).
Non-Final Office Action on U.S. Appl. No. 16/493,511 dated Jul. 1, 2021.
Notice of Allowance on U.S. Appl. No. 16/083,945 dated Jul. 8, 2021.
Non-Final Office Action for U.S. Appl. No. 16/478,092, dated Jul. 30, 2021.
International Search Report and Written Opinion issued for PCT Application No. PCT/US2021/017197 dated Jun. 25, 2021, 16 pages.
Extended European Search Report issued for European Patent Application No. EP 22196095.8 dated Dec. 13, 2022, 7 pages.
International Search Report & Written Opinion for PCT/US2010/024765 dated Apr. 7, 2010, 9 pages.
International Search Report & Written Opinion for PCT/US2018/014401 dated May 15, 2018, 9 pages.
International Search Report & Written Opinion for PCT/US2018/018724 dated Apr. 24, 2018, 13 pages.

* cited by examiner

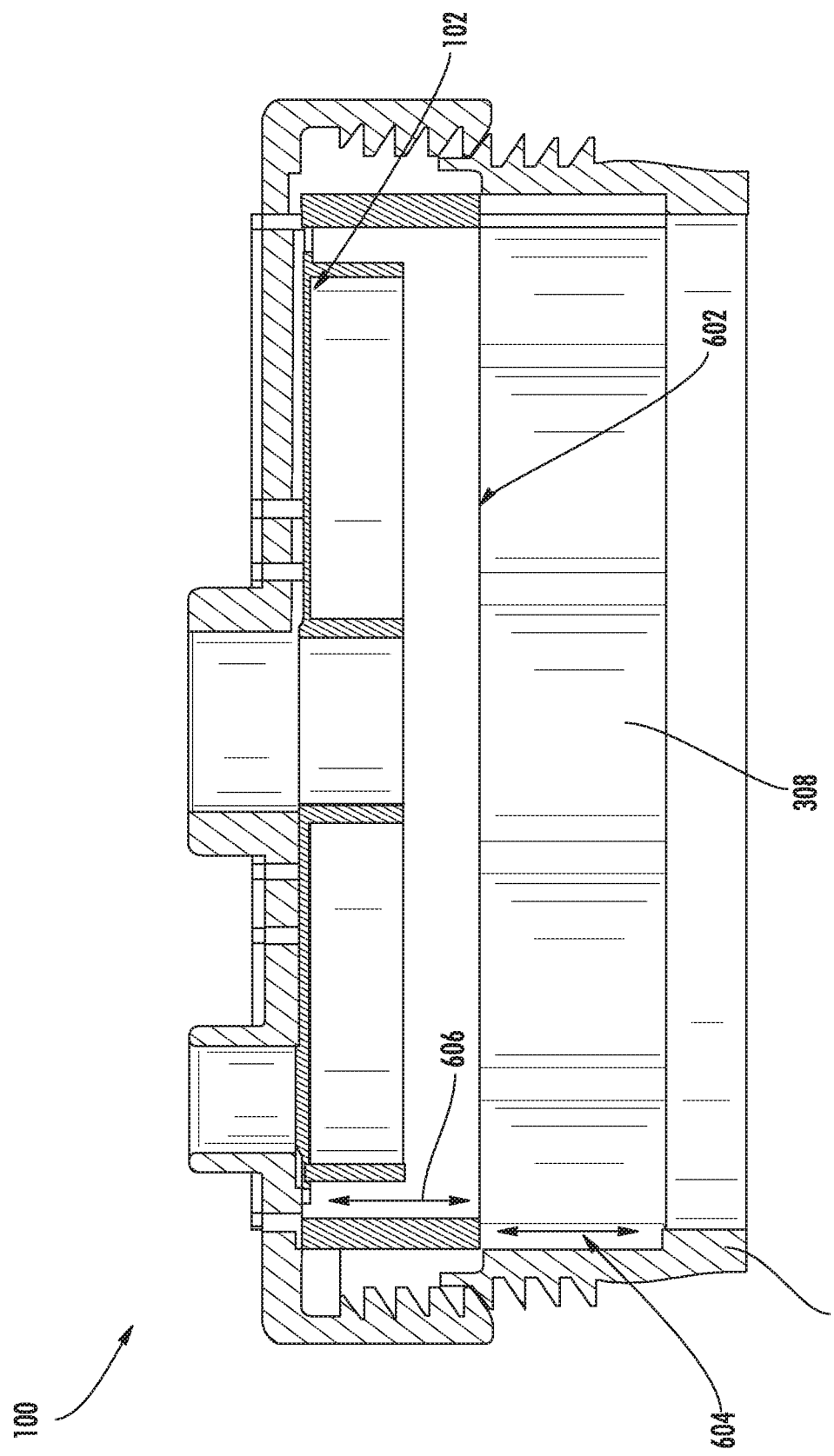

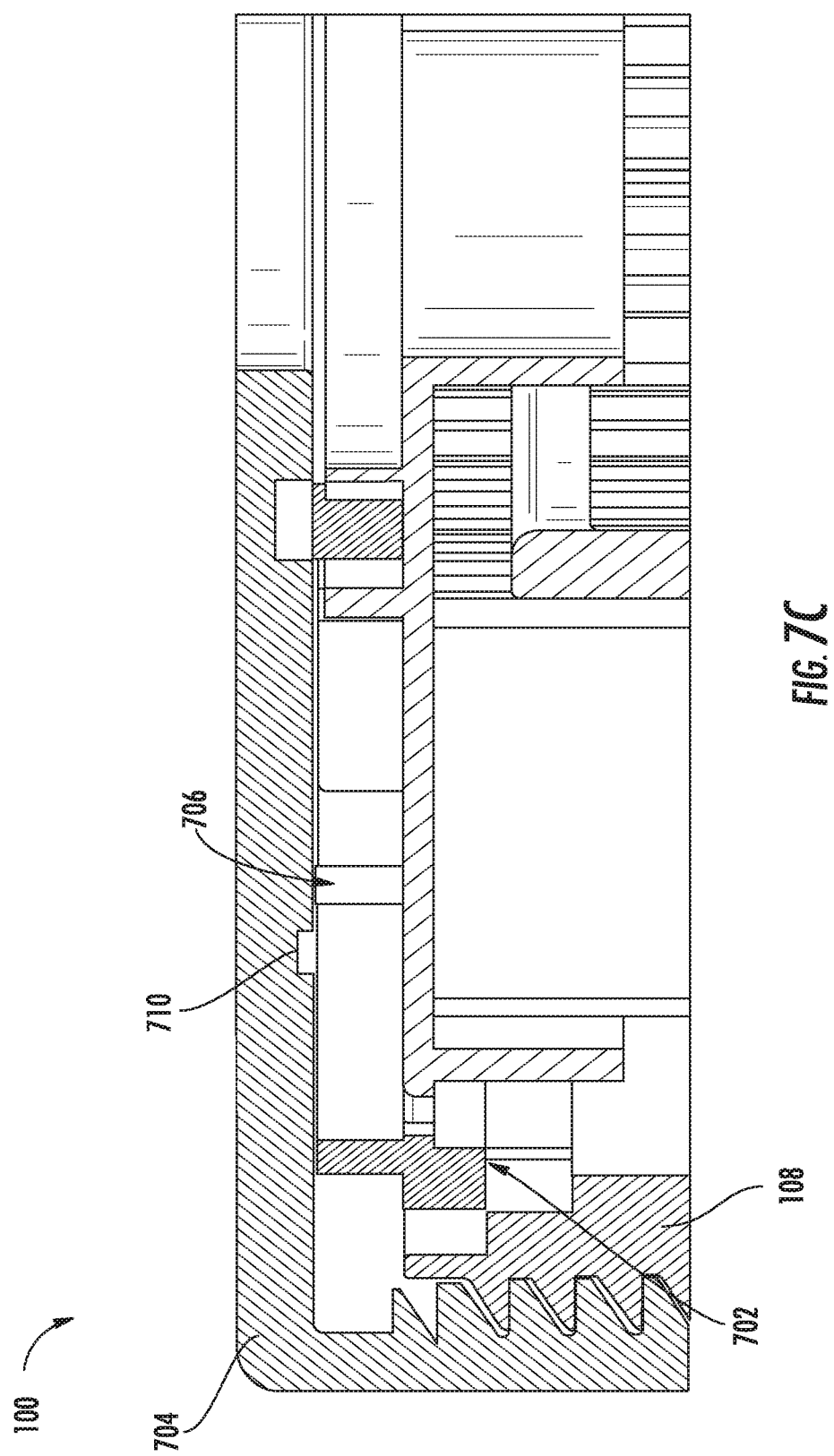

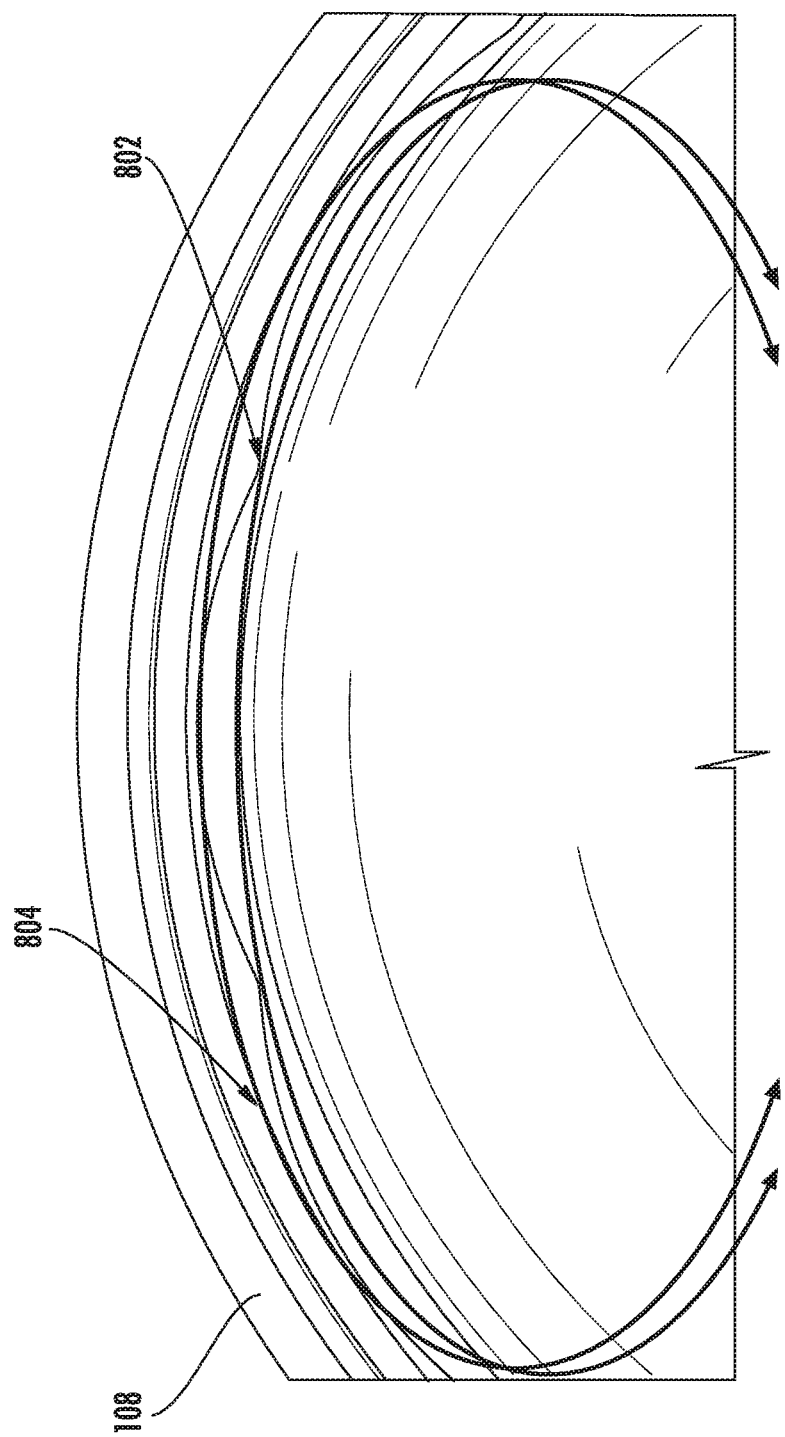

UNDULATED INTERLOCKING HOUSING-ENDPLATE INTERFACE GEOMETRY

CROSS-REFERENCE TO RELATED PATENT APPLICATION

The present application is the U.S. national stage of PCT Application No. PCT/US2018/018724, filed Feb. 20, 2018, which claims the benefit of and priority to U.S. Provisional Patent Application No. 62/461,497, filed Feb. 21, 2017, the contents of which are incorporated herein by reference in their entireties.

TECHNICAL FIELD

The present application relates to filtration systems.

BACKGROUND

Internal combustion engines generally combust a mixture of fuel (e.g., gasoline, diesel, natural gas, etc.) and air. Lubrication oil is also supplied to the engine to lubricate the various moving components of the engine. Either prior to entering the engine or during engine operation, the intake air, fuel, lubrication oil, and other fluids are typically passed through filtration systems to remove contaminants (e.g., dust, water, oil, etc.) from the fluids. The filtration systems include filter elements having filter media. As the fluid passes through the filter media, the filter media removes at least a portion of the contaminants in the fluid.

Oftentimes, the filter elements in the filtration systems require periodic replacement (e.g., as the pressure drop across the filter media increases). As cost saving measures, some technicians install counterfeit, non-genuine, or non-authorized filter elements into the filtration system (collectively referred to as "non-authorized" filter elements). Such non-authorized filter elements may not conform to original manufacturer quality, performance and safety parameters. For example, the non-authorized filter elements may utilize sub-optimal sealing technology, sub-optimal filter media, poor or improper assembly, or the like. Accordingly, non-authorized filter elements may allow more contaminants to pass through the filtration system, thereby damaging the downstream components (e.g., the internal combustion engine, pumps, turbochargers, etc.).

SUMMARY

Various example embodiments relate to filter elements and filter housings that include an undulated interlocking housing-endplate interface geometry. One example embodiment relates to a filter element. The filter element includes filter media and a first endplate coupled to the filter media. The first endplate includes a top surface and a bottom surface parallel to and displaced from the top surface. The first endplate includes a central opening passing through the top surface and the bottom surface. The first endplate further includes at least one inlet. The first endplate further includes a first undulated wall positioned between the top surface and the bottom surface. The first undulated wall includes a repeating pattern that defines an outer circumferential uneven surface structured to mesh with a matching repeating pattern of a shell housing when the filter element is installed in the shell housing.

Another example embodiment relates to a filtration system. The filtration system includes a filter mounting head having a fluid inlet and a fluid outlet. The filtration system further includes a shell housing removably coupled to the filter mounting head through a threaded connection. The shell housing defines a central compartment. The shell housing includes a second undulating wall having the matching repeating pattern. The filtration system further includes a filter element positioned within the central compartment. The filter element includes filter media and a first endplate coupled to the filter media. The first endplate includes a top surface and a bottom surface parallel to and displaced from the top surface. The first endplate includes a central opening passing through the top surface and the bottom surface. The first endplate further includes at least one inlet. The first endplate further includes a first undulated wall positioned between the top surface and the bottom surface. The first undulated wall includes a repeating pattern that defines an outer circumferential uneven surface structured to mesh with the matching repeating pattern of the shell housing.

Another example embodiment relates to a filter element. The filter element includes filter media and a first endplate coupled to the filter media. The first endplate includes a top surface and a bottom surface parallel to and displaced from the top surface. The first endplate includes a central opening passing through the top surface and the bottom surface. The first endplate further includes at least one inlet. The first endplate further includes a first undulated wall positioned between the top surface and the bottom surface. The first undulated wall includes a repeating pattern that defines an outer circumferential uneven surface structured to mesh with a matching repeating pattern of a shell housing when the filter element is installed in the shell housing. The top surface includes a nutplate and the bottom surface includes an endplate. The nutplate includes a top nutplate surface and a bottom nutplate surface parallel to and displaced from the top nutplate surface. The first undulated wall is disposed between the top nutplate surface and the bottom nutplate surface. The endplate includes a top endplate surface and a bottom endplate surface parallel to and displaced from the top endplate surface. The top endplate surface is substantially parallel to the bottom nutplate surface. The top endplate surface is spaced away from the bottom nutplate surface by a fluid passageway.

Another example embodiment relates to a filtration system. The filtration system includes a filter mounting head having a fluid inlet and a fluid outlet. The filtration system further includes a shell housing removably coupled to the filter mounting head through a threaded connection. The shell housing defines a central compartment. The shell housing includes a second undulating wall having the matching repeating pattern. The filtration system further includes a filter element positioned within the central compartment. The filter element includes filter media and a first endplate coupled to the filter media. The first endplate includes a top surface and a bottom surface parallel to and displaced from the top surface. The first endplate includes a central opening passing through the top surface and the bottom surface. The first endplate further includes at least one inlet. The first endplate further includes a first undulated wall positioned between the top surface and the bottom surface. The first undulated wall includes a repeating pattern that defines an outer circumferential uneven surface structured to mesh with the matching repeating pattern of the shell housing. The top surface includes a nutplate and the bottom surface includes an endplate. The nutplate includes a top nutplate surface and a bottom nutplate surface parallel to and displaced from the top nutplate surface. The first undulated wall is disposed between the top nutplate surface and the bottom nutplate surface. The endplate includes a top endplate surface and a bottom endplate surface parallel to and displaced from the top endplate surface. The top endplate surface is substantially parallel to the bottom nutplate surface. The top endplate surface is spaced away from the bottom nutplate surface by a fluid passageway.

Another example embodiment relates to a filter element. The filter element includes filter media and a first endplate coupled to the filter media. The first endplate includes a top surface and a bottom surface parallel to and displaced from the top surface. The first endplate includes a central opening passing through the top surface and the bottom surface. The first endplate further includes at least one inlet. A flange axially protrudes away from and is perpendicular to the bottom surface. The first endplate further includes a first undulated wall positioned on a surface of the flange. The first undulated wall protrudes radially away from the flange and has a pattern that defines an outer circumferential surface structured to mesh with a matching repeating pattern of a shell housing when the filter element is installed in the shell housing.

Another example embodiment relates to a filtration system. The filtration system includes a filter mounting head having a fluid inlet and a fluid outlet. The filtration system further includes a shell housing removably coupled to the filter mounting head through a threaded connection. The shell housing defines a central compartment. The shell housing includes a second undulating wall having the matching repeating pattern. The filtration system further includes a filter element positioned within the central compartment The filter element includes filter media and a first endplate coupled to the filter media. The first endplate includes a top surface and a bottom surface parallel to and displaced from the top surface. The first endplate includes a central opening passing through the top surface and the bottom surface. The first endplate further includes at least one inlet. A flange axially protrudes away from and is perpendicular, or substantially perpendicular, to the bottom surface. The first endplate further includes a first undulated wall positioned on a surface of the flange. The first undulated wall protrudes radially away from the flange and has a pattern that defines an outer circumferential surface structured to mesh with a matching repeating pattern of a shell housing when the filter element is installed in the shell housing.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 6 shows a cross-sectional view of a non-authorized filter element being improperly installed in the filtration system of FIG. 1.

FIG. 7C shows a cross-sectional view of the first endplate of FIG. 7A interfacing with the filter mounting head of FIG. 7B.

FIG. 8A shows a perspective view of different first endplates being mounted into a shell housing.

DETAILED DESCRIPTION

Referring to the figures generally, a filtration system having an undulated interlocking housing-endplate interface geometry is described. In the filtration system, a filter element endplate and a filter housing component (e.g., a shell housing, a filter mounting head, etc.) meet at an interface. The interface may form a seal between the endplate and the filter housing component. The filter housing component includes an undulating or repeating pattern that meshes with a matching undulating or repeating pattern on the endplate of the filter element. The two undulating or repeating patterns "mesh" when the two patterns engage and lock in a similar manner as the teeth of two meshing gears thereby preventing substantial rotation of the endplate with respect to the filter housing component (i.e., preventing the endplate from rotating with respect to the filter housing component by more than five degrees in a given direction). In some arrangements, the undulating interlocking interface forms a seal between the filter housing component and the endplate. In some embodiments, the endplate with the undulating or repeating pattern may include an integrated nutplate. The endplate with the integrated nutplate can provide drop-in and drop-out assembly of the filter element into the filter housing. In other embodiments, the pattern on the endplate includes mesh protrusions (e.g., fingers) that interlock (e.g., snap) with a lip formed on the inside of the filter housing.

As will be appreciated, if a non-authorized filter element lacking the matching undulating pattern is attempted to be installed in or on the filter housing component, the non-authorized filter element may not fit against the filter housing component and/or may not form the appropriate seal with the filter housing component. Accordingly, the undulating or repeating pattern prevents non-authorized filter elements from being installed in the filtration system. Additionally, the undulating or repeating pattern prevents the filter element from freely rotating with respect to the filter housing component of the filtration system.

Figure 1:
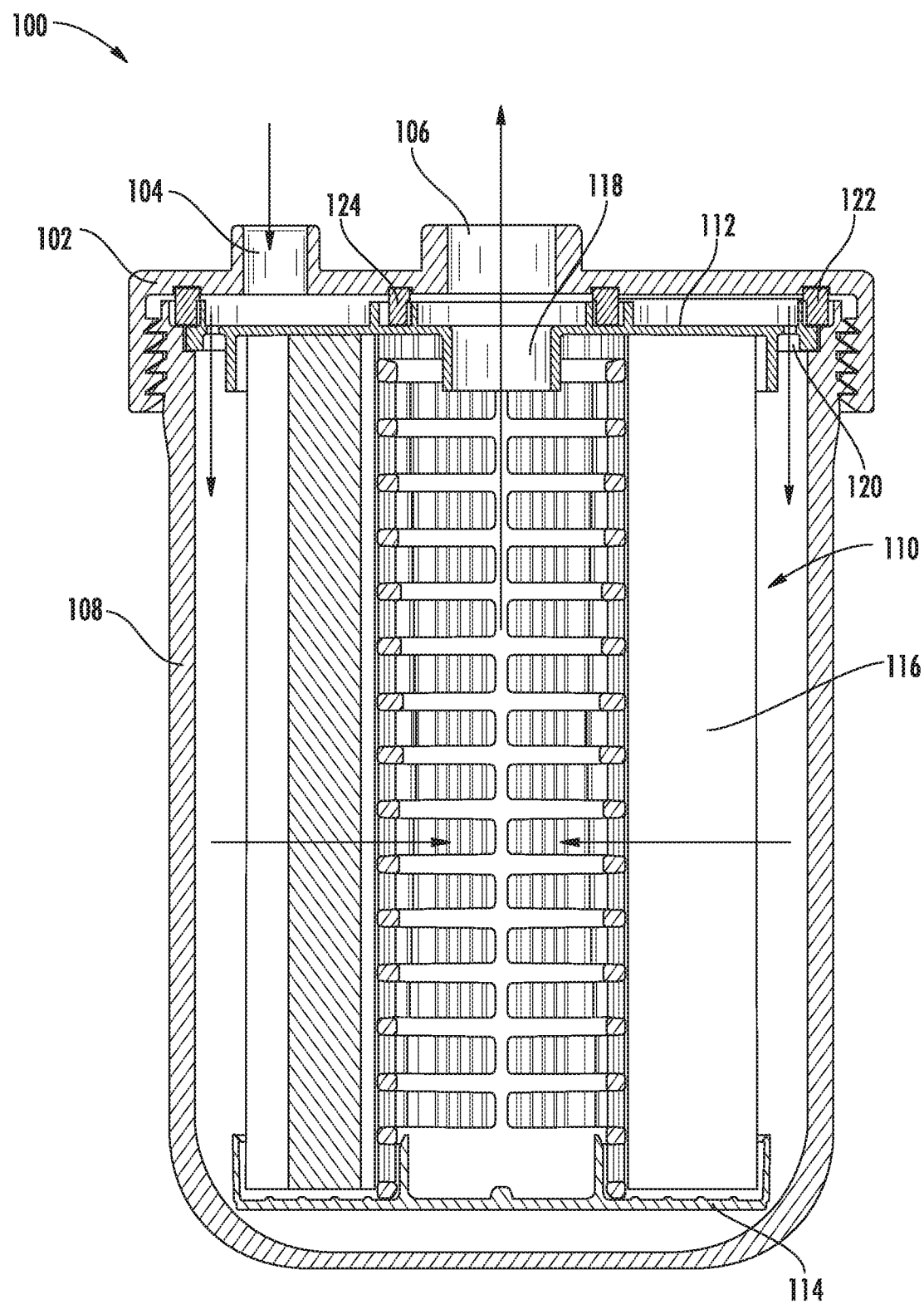
FIG. 1 shows a cross-sectional view of a filtration system according to an example embodiment.

Referring to FIG. 1, a cross-sectional view of a filtration system 100 is shown according to an example embodiment. The filtration system 100 may be a fuel filtration system, a lubricant filtration system, a hydraulic fluid filtration system, a water filtration system, or the like. The filtration system 100 includes a filter mounting head 102 having an inlet 104 and an outlet 106. The filter mounting head 102 removably receives a shell housing 108 through a threaded connection. The shell housing 108 is substantially cylindrical in shape having an open top end adjacent to the filter mounting head 102 and a closed bottom end opposite the open top end. In some arrangements, the closed bottom end includes a closeable drain opening, a sensor port, or another opening that can be selectively sealed.

A filter element 110 is installed in the filtration system 100. The filter element 110 is received in a central compartment formed by the shell housing 108. The filter element 110 includes a first endplate 112, a second endplate 114, and filter media 116 positioned between the first endplate 112 and the second endplate 114. The filter media 116 is arranged in a cylindrical manner between the first endplate 112 and the second endplate 114. As shown in FIG. 1, the first endplate 112 is an open endplate that includes a central opening 118 in fluid communication with the outlet 106. The second endplate 114 is a closed endplate. The first endplate 112 includes at least one inlet opening 120 in fluid communication with the inlet 104. In some arrangements, the total inlet flow area created by the at least one inlet opening 120 is larger than the most restrictive design feature of the system receiving the fluid such that the inlet openings 120 are not the most restrictive design feature.

Figure 2:
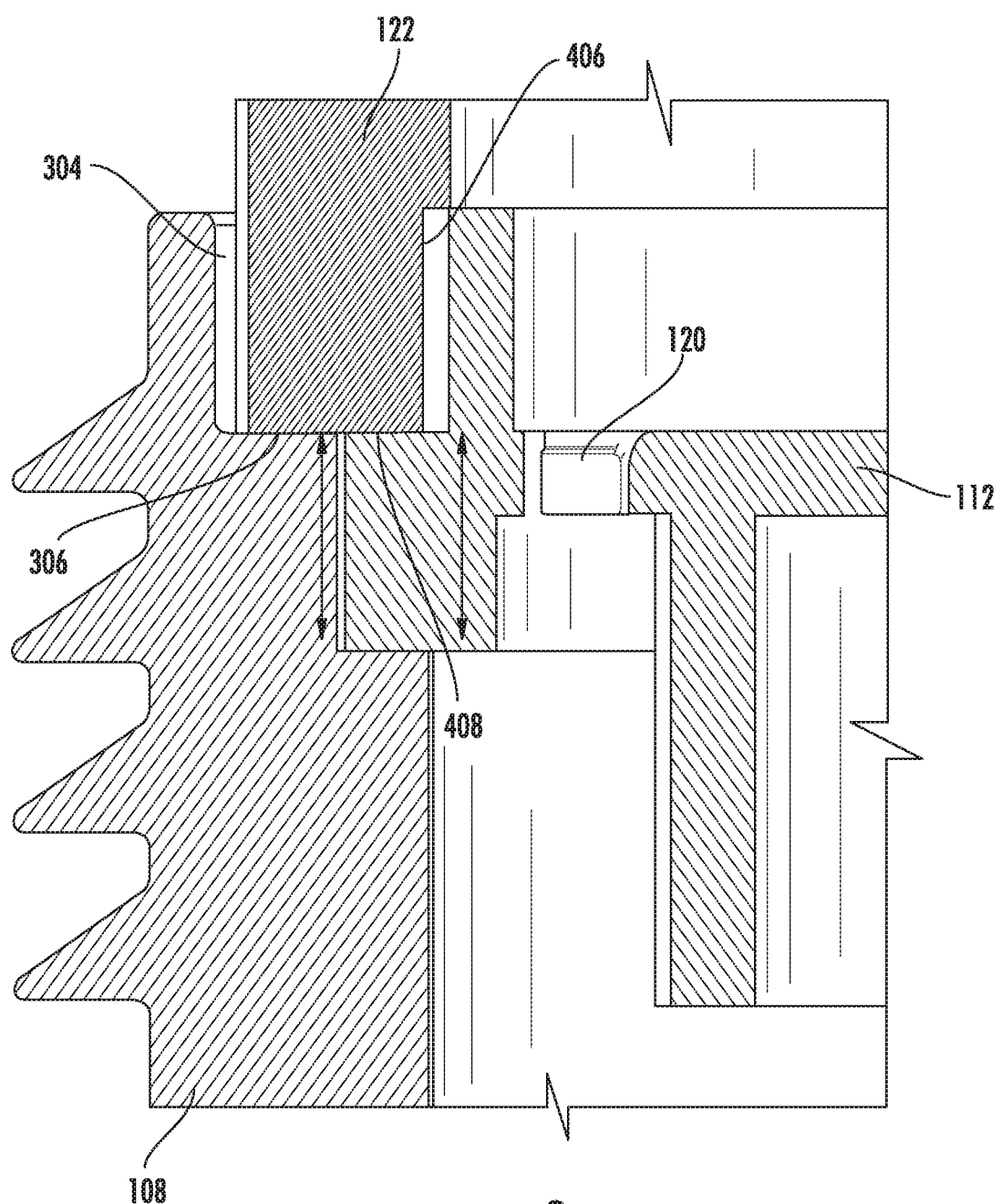
FIG. 2 shows a cross-sectional view of the interaction between the first endplate and the shell housing of the filtration system of FIG. 1.

The filtration system 100 includes an outer seal member 122 and an inner seal member 124. The outer seal member 122 is supported in a U-shaped channel formed by the first endplate 112 and the shell housing 108 (e.g., as shown in FIG. 2, which shows a cross-sectional view of the interaction between the first endplate 112 and the shell housing 108). The inner seal member 124 is supported in a U-shaped channel formed by projections on the first endplate 112. When the filter element 110 and the shell housing 108 are installed in the filtration system 100 (e.g., as shown in FIG. 1), the outer seal member 122 and inner seal member 124 are pressed against the filter head and form seals. The space defined between the outer seal member 122 and the inner seal member 124 is in fluid communication with the inlet 104 and the inlet openings 120. The space inside of the inner seal member 124 is in fluid communication with the outlet 106 and the central opening 118. Accordingly, when the filter element 110 is installed in the filtration system (as shown in FIG. 1), fluid to be filtered flows through the inlet 104, through the inlet openings 120, through the filter media 116 in an outside-in flow direction, out the central opening 118, and out the outlet 106 as shown by the flow arrows of FIG. 1.

As described in further detail below with respect to FIGS. 3A through 6, the shell housing 108 and the first endplate 112 include matching undulated surfaces that mesh when the filter element 110 is installed in the shell housing 108. The matching undulated surfaces include a plurality of curves or shapes. The matching undulated surfaces prevent the filter element 110 from rotating with respect to the shell housing 108 during installation of the shell housing 108 to the filter mounting head 102. Additionally, the undulated surface of the shell housing 108 prevents a non-authorized filter element (e.g., a filter element without the matching undulated surface) from being installed in the shell housing 108 and ultimately installed in the filtration system 100.

Figure 3A:
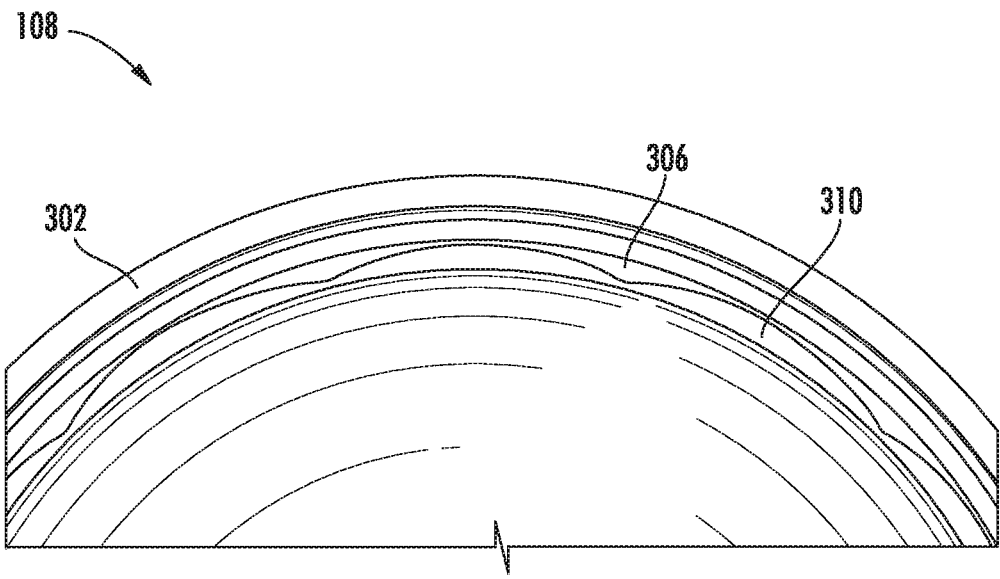
FIG. 3A shows a top view of a portion of the shell housing of the filtration system of FIG. 1.
Figure 3B:
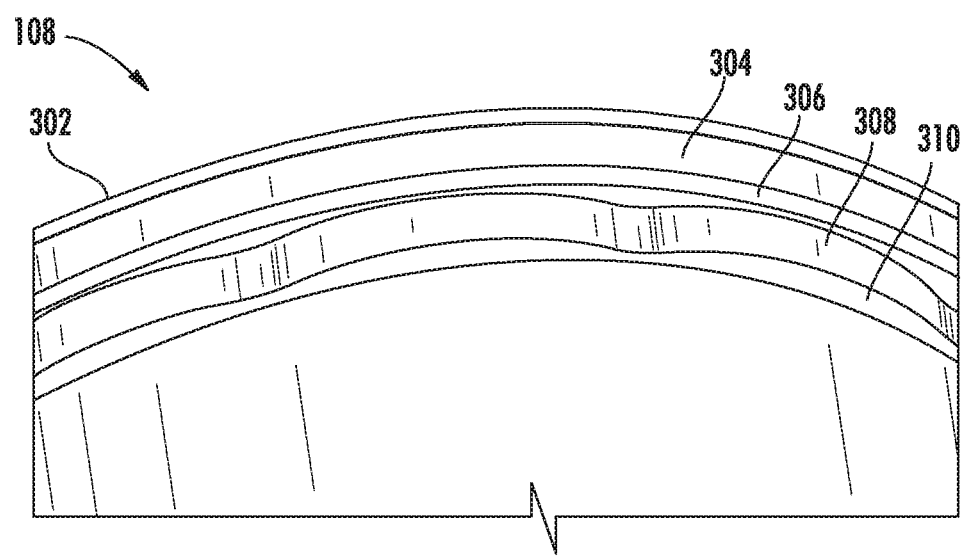
FIG. 3B shows a perspective view of the portion of the shell housing of the filtration system of FIG. 1.

Referring to FIGS. 3A and 3B, views of the shell housing 108 are shown. FIG. 3A shows a top view of a portion of the shell housing 108. FIG. 3B shows a perspective view of the same portion of the shell housing 108 shown in FIG. 3A. As described above with respect to FIG. 1, the shell housing 108 includes an open top end. The open top end is defined by a top surface 302, a gasket retaining wall 304, a gasket retaining lip 306, an undulated wall 308, and an endplate retaining lip 310. In some arrangements, the top surface 302, the gasket retaining lip 306, and the endplate retaining lip 310 are parallel, or substantially parallel, surfaces. In some arrangements, the gasket retaining wall 304 and the undulated wall 308 are perpendicular, or substantially perpendicular, to the top surface 302, the gasket retaining lip 306, and/or the endplate retaining lip 310. The gasket retaining wall 304 and the gasket retaining lip 306 define a first portion of the U-shaped channel (a first half of the U-shaped channel in one embodiment) that receives the outer seal member 122 (as described above with respect to FIGS. 1 and 2). The undulated wall 308 and the endplate retaining lip 310 receive the first endplate 112 when the filter element 110 is installed in the shell housing 108. The undulated wall 308 defines an inner circumferential uneven surface such that only filter elements with a complimentary undulated wall (e.g., the undulated wall 410 of the first endplate 112) can be retained in the shell housing 108. The undulated pattern that defines the undulated wall 308 may be continuous or intermittent throughout the inner circumference of the undulated wall 308. As used herein, "undulated" or "undulating" may refer to a repeating pattern or non-repeating pattern that may follow a wave pattern (e.g., a sinusoidal pattern), a flower pattern, a triangular pattern, a continuous pattern (e.g., raised surface), or any other pattern such that a mating pattern can mesh with the undulated or undulating pattern.

Figure 4A:
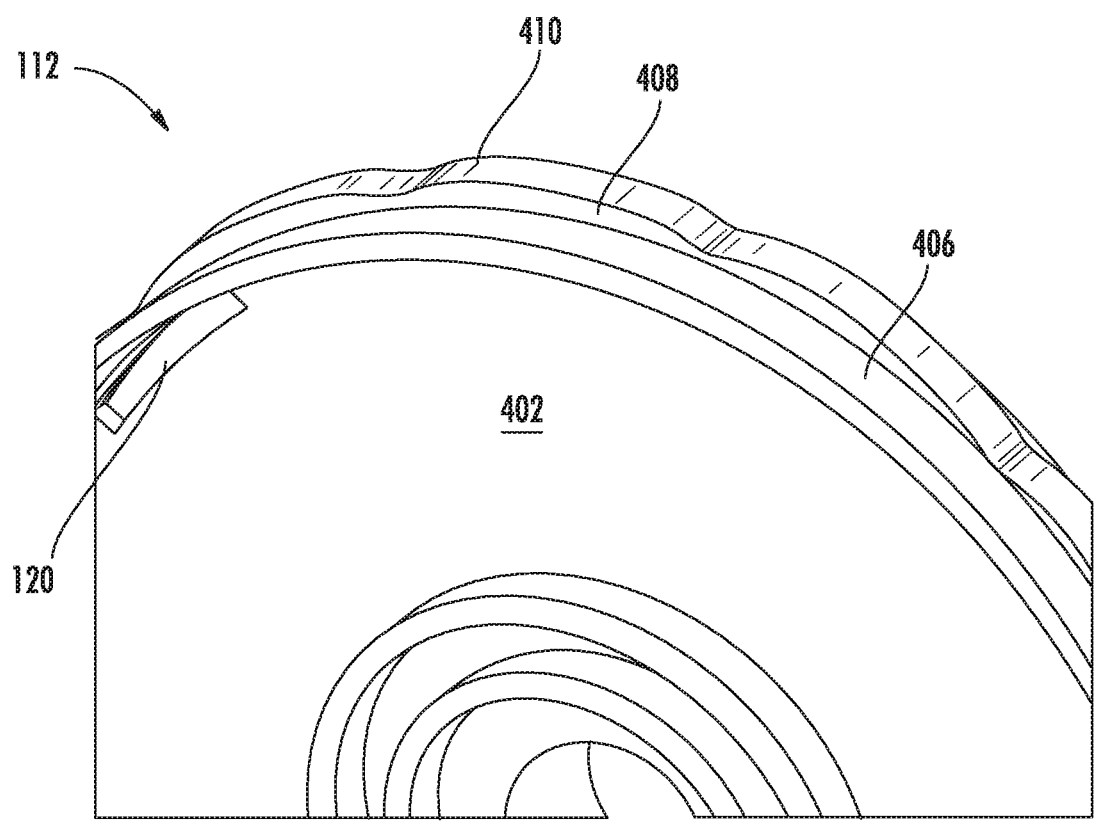
FIG. 4A shows a portion of a perspective view of a top side of the first endplate of the filtration system of FIG. 1.
Figure 4B:
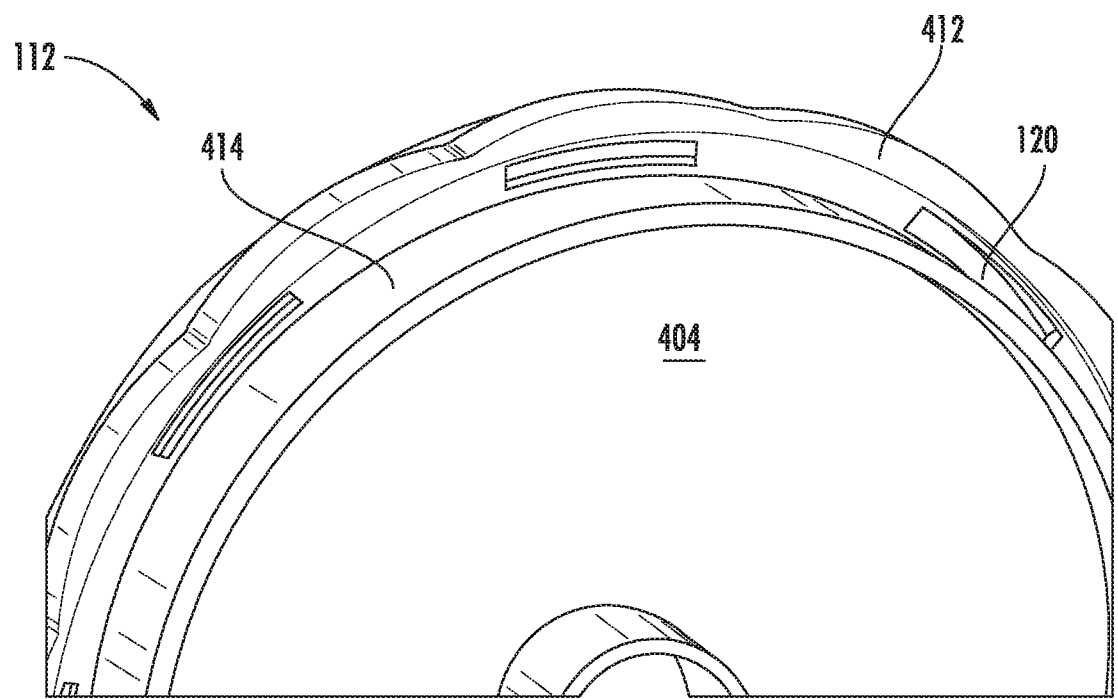
FIG. 4B shows a portion of a perspective view of a bottom side of the first endplate of the filtration system of FIG. 1.

Referring to FIGS. 4A and 4B, views of the first endplate 112 are shown. FIG. 4A shows a portion of a perspective view of a top side of the first endplate 112. FIG. 4B shows a portion of a perspective view of a bottom side of the first endplate 112. The first endplate 112 includes a top surface 402 and a bottom surface 404. The top surface 402 and bottom surface 404 are parallel, or substantially parallel, and displaced from each other. The first endplate 112 includes a gasket retaining wall 406 extending from the top surface 402, a gasket retaining lip 408, an undulated wall 410, a housing support lip 412, and a lower wall 414 extending from the bottom surface. In some arrangements, the top surface 402, the gasket retaining lip 408, the housing support lip 412, and the bottom surface 404 are all parallel, or substantially parallel, to each other. In some arrangements, the gasket retaining wall 406, the undulated wall 410, and the lower wall 414 are perpendicular, or substantially perpendicular, to the top surface 402, the bottom surface 404, the gasket retaining lip 408, and/or the housing support lip 412. The gasket retaining wall 406 and the gasket retaining lip 408 define a second half of the U-shaped channel that receives the outer seal member 122 (as described above with respect to FIGS. 1 and 2). The undulated wall 410 and the housing support lip 412 are sized and shaped to be supported by the undulated wall 308 and the endplate retaining lip 310 of the shell housing 108 when the filter element 110 is installed in the shell housing 108. The undulated wall 410 defines an outer circumferential uneven surface such that is complimentary with undulated wall 308 of the shell housing 108. The undulated pattern that defines the undulated wall 308 may be continuous or intermittent throughout the inner circumference of the undulated wall 308. The undulated pattern may follow a wave pattern, a flower pattern, a triangular pattern, or the like so long as the undulated patter of the undulated wall 410 is complimentary with the undulated pattern of the undulated wall 308.

Figure 5A:
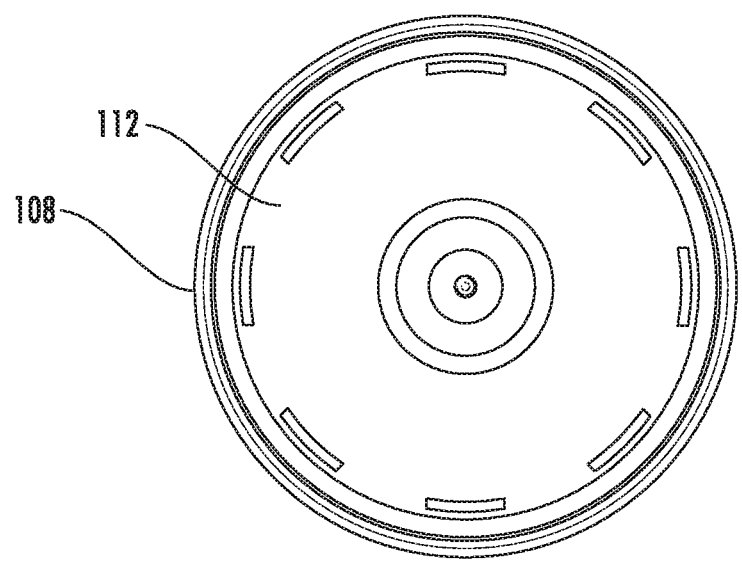
FIG. 5A shows a top view of the first endplate installed in the shell housing of the filtration system of FIG. 1.
Figure 5B:
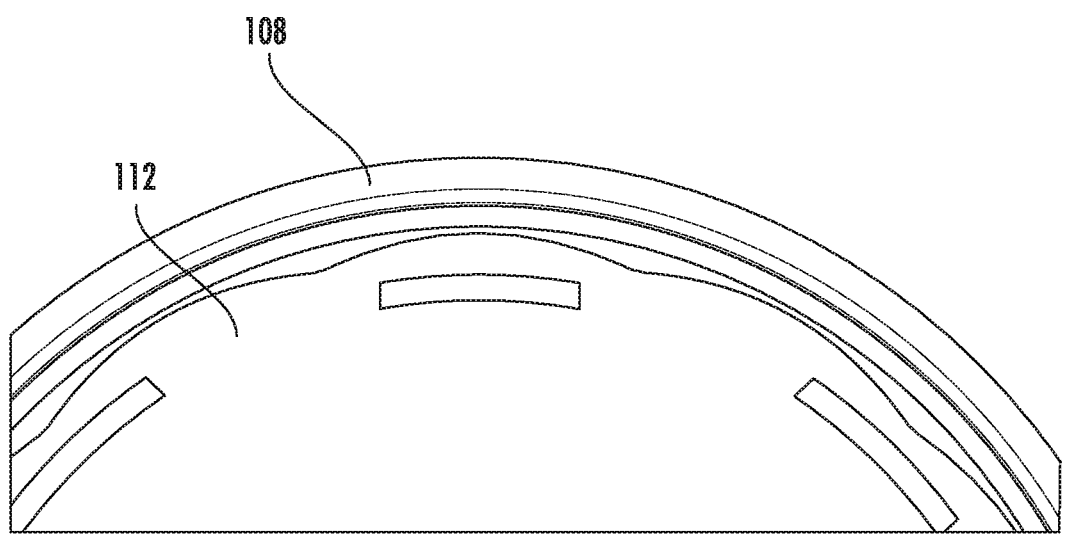
FIG. 5B shows a close-up view of the first endplate installed in the shell housing of the filtration system of FIG. 1.

Accordingly, since the filter element 110 is an authorized filter element, the first endplate 112 can be received in the shell housing 108 as shown in FIGS. 5A and 5B. When the filter element 110 is installed in the shell housing 108, the undulated wall 410 of the first endplate 112 meshes with the undulated wall 308 of the shell housing 108 such that the first endplate 112 (and thus the filter element 110) cannot be rotated with respect to the shell housing 108. Further, as shown best in FIG. 2, when the filter element 110 is installed in the shell housing 108, the first endplate 112 and the shell housing 108 form a U-shaped channel that receives the outer seal member 122. The outer seal member 122 is supported by the gasket retaining wall 304, the gasket retaining lip 306, the gasket retaining wall 406, and the gasket retaining lip 408. When the filter element 110 is installed in the filtration system 100, the outer seal member 122 will undergo compression as it is pressed between the filter mounting head 102 and the U-shaped channel that causes the outer seal member 122 to press against the walls of the U-shaped channel and the filter mounting head 102. In some arrangements, the walls of the U-shaped channel are at least two-thirds the height of the outer seal member 122.

If a technician attempts to insert a non-authorized filter element into the shell housing 108 (e.g., a filter element that does not include a first endplate having the undulated wall 410), the non-authorized filter element will not fit in the shell housing 108. For example, as shown in FIG. 6, a first endplate 602 of a non-authorized filter element will not slide all the way in to the shell housing 108 because the pattern of the undulated wall 308 prevents the first endplate 602 from sliding into the shell housing 108. Accordingly, the non-authorized filter element is raised from a fully installed position by the height 604 of the undulated wall 308, and sits above the top of the undulated wall 308 by the height 606 of the first endplate. The height 604 is sufficiently large to allow the first endplate 602 to protrude above the top surface 302 of the shell housing 108. Since the first endplate 602 is raised, the first endplate 602 comes into contact with the filter mounting head 102 before the threaded connection between the shell housing 108 and the filter mounting head 102 is engaged (and before any seals form between the first endplate 602 and the filter mounting head 102), which prevents the non-authorized filter element from being installed in the filtration system 100. If a filter element is not installed in the filtration system 100, any corresponding system associated with the filtration system 100 (e.g., an internal combustion engine) may be prevented from starting. The height 604 may be varied depending on the application such that any installed non-authorized filter element protrudes above the top surface 302 thereby preventing the threads of the shell housing 108 from coupling to the threads of the filter mounting head 102.

Figure 7A:
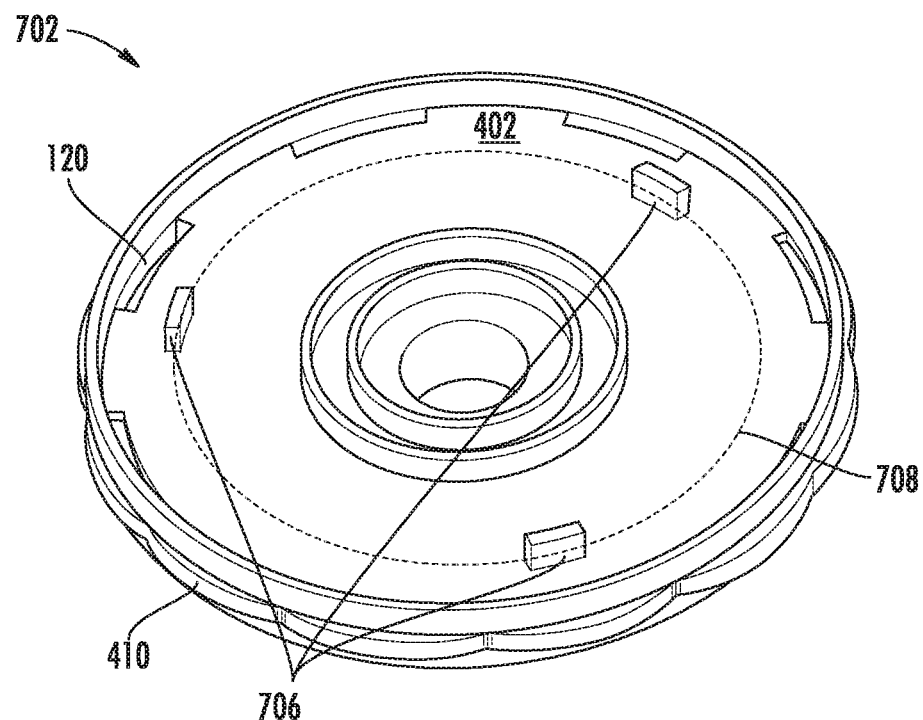
FIG. 7A shows a perspective view of a first endplate according to an example embodiment.
Figure 7B:
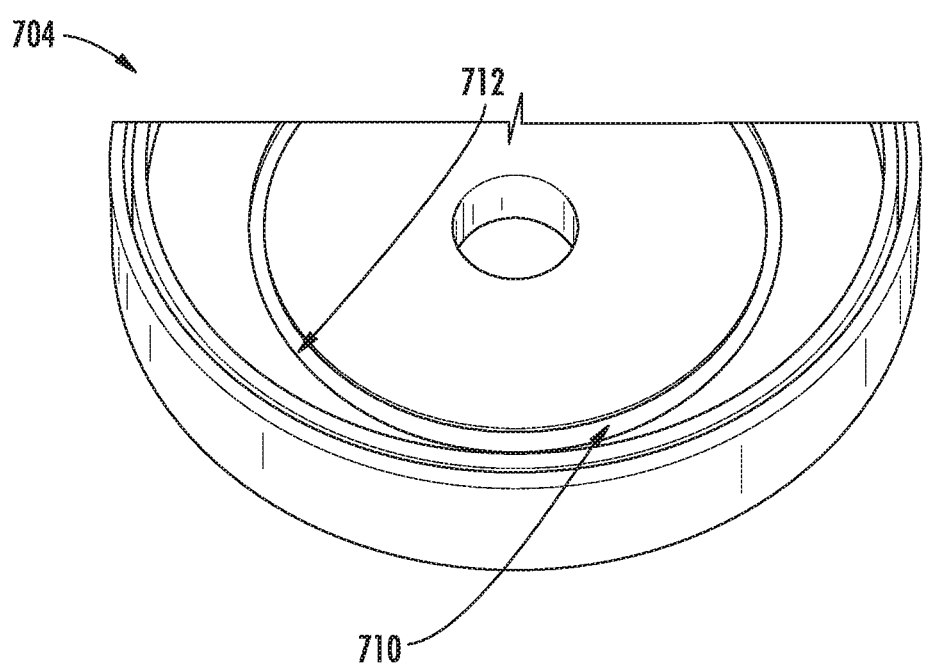
FIG. 7B shows a perspective view of a filter mounting head according to an example embodiment.

Referring to FIGS. 7A, 7B, and 7C, a first endplate 702 and filter mounting head 704 are shown according to another example embodiment. The first endplate 702 and the filter mounting head 704 may be used in place of the first endplate 112 and the filter mounting head 102 in the same manner as described above with respect to the filtration system 100. Accordingly, like numbering is used to designate similar components between the filtration system 100 and the components shown in FIGS. 7A, 7B, and 7C. As shown in FIG. 7A, the first endplate 702 includes raised tabs 706 extending from the top surface 402. Although three tabs 706 are shown, any number of tabs may be positioned on the top surface 402. The tabs are evenly spaced at the same radius from a center point of the first endplate 702 such that the tabs fall along the circle 708 defined by the radius and the center point. As shown in FIG. 7B, the filter mounting head includes a circular channel 710. In some arrangements the circular channel 710 is interrupted with a notch 712 that interferes with the tabs 706 during rotation of the first endplate 702 with respect to the filter mounting head 704.

As shown best in FIG. 7C, the circular channel 710 is sized and shaped to receive the tabs 706 of the first endplate 702 when the filter element 110 is installed in the filtration system 100. During installation of the filter element 110 in the filtration system 100, the tabs 706 are received in the channel 710. As the shell housing 108 is rotated to form the threaded connection between the shell housing 108 and the filter mounting head 704, the filter element also rotates until one of the tabs 706 abuts the notch 712. The filter element 110 is then rotationally locked with respect to the filter mounting head 704 while the shell housing 108 continues to rotate. When the pattern of the undulated wall 410 lines up with the matching pattern of the undulated wall 308, the filter element 110 and the first endplate 702 drop into the shell housing 108 and will seat correctly within the shell housing 108 (e.g., as shown in FIG. 2). Accordingly, the tabs 706 and circular channel 710 having the notch 712 serve as a guiding feature that allows the filter element 110 to easily drop down into the shell housing 108 when the undulated patterns on the shell housing 108 and first endplate 702 line up. If a non-authorized filter element having a different tab arrangement (or no tabs) is attempted to be installed in the filtration system 100, the non-authorized filter element will not rotate and fall into the shell housing 108 as described above.

Figure 8B:
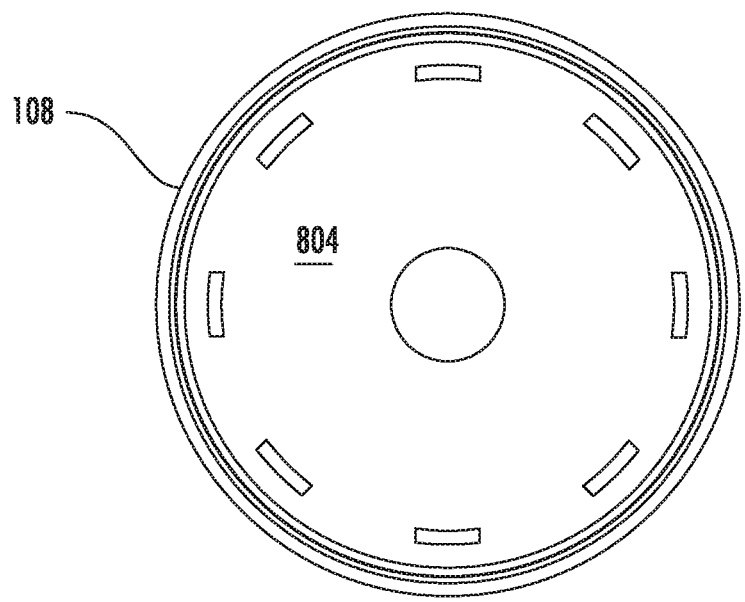
FIGS. 8B and 8C show views of a first arrangement of the first endplate of FIG. 8A mounted into the shell housing.

Referring to FIG. 8A, a perspective view of the outlines of a first endplate 802 and a second endplate 804 positioned within the shell housing 108 are shown according to an example embodiment. Each of the first endplate 802 or second endplate 804 may be substituted for the first endplate 112 of the filtration system 100. The first endplate 802 is inscribed within the undulating pattern that matches the undulated wall 308 of the shell housing 108 such that the first endplate 802 conforms to the small circle that can be drawn touching the troughs of the undulating pattern. The second endplate 804 circumscribes the undulating pattern of the undulated wall 308 of the shell housing 108 such that the second endplate 804 conforms to the largest circle that can be drawn touching the peaks of the undulating pattern. The first endplate 802 and second endplate 804 are described in further detail below with respect to FIGS. 8B through 8E.

Figure 8C:
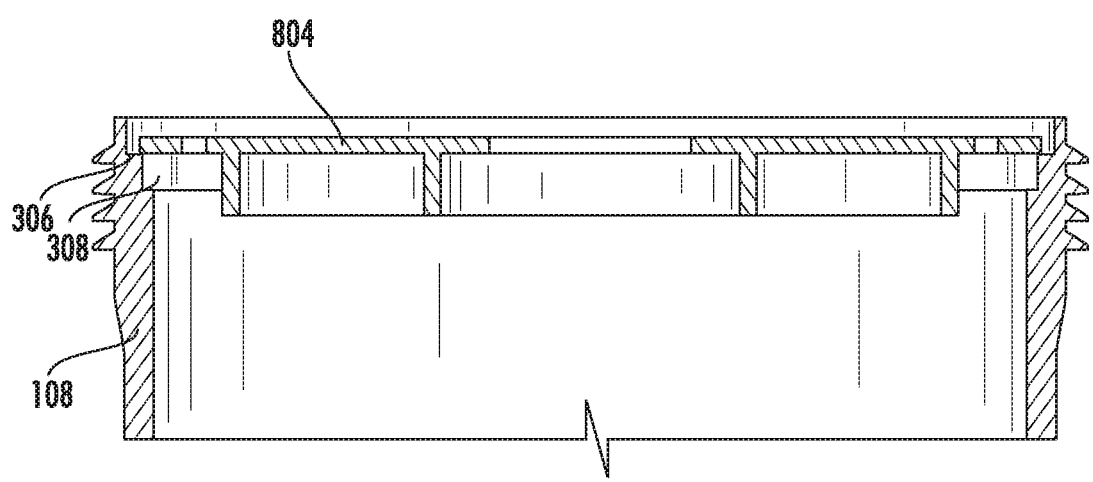

FIGS. 8B and 8C each show different views of the second endplate 804 positioned within the shell housing 108 as described above with respect to FIG. 8A. As shown in FIGS. 8B and 8C, the second endplate 804 is circumscribed with the undulating pattern that matches the undulated wall 308 of the shell housing 108 such that the second endplate 804 rests on the gasket retaining lip 306 of the shell housing 108. In this arrangement, the first endplate 802 only contacts the innermost edges of the undulating pattern of the undulated wall 308. In some arrangements, the second endplate 804 may form a seal with the shell housing 108.

Figure 8D:
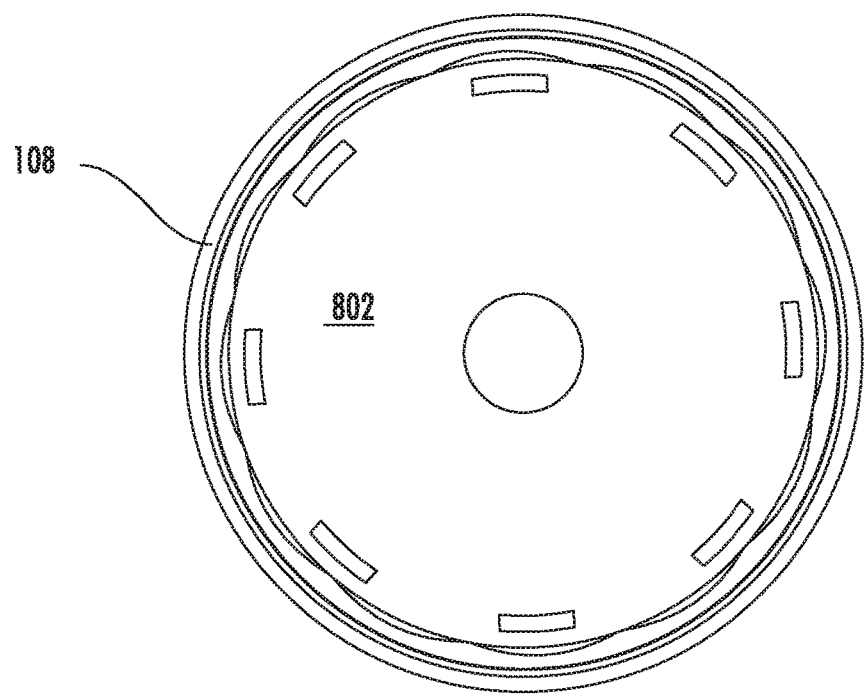
FIGS. 8D and 8E show views of a second arrangement of the first endplate of FIG. 8A mounted into the shell housing.
Figure 8E:
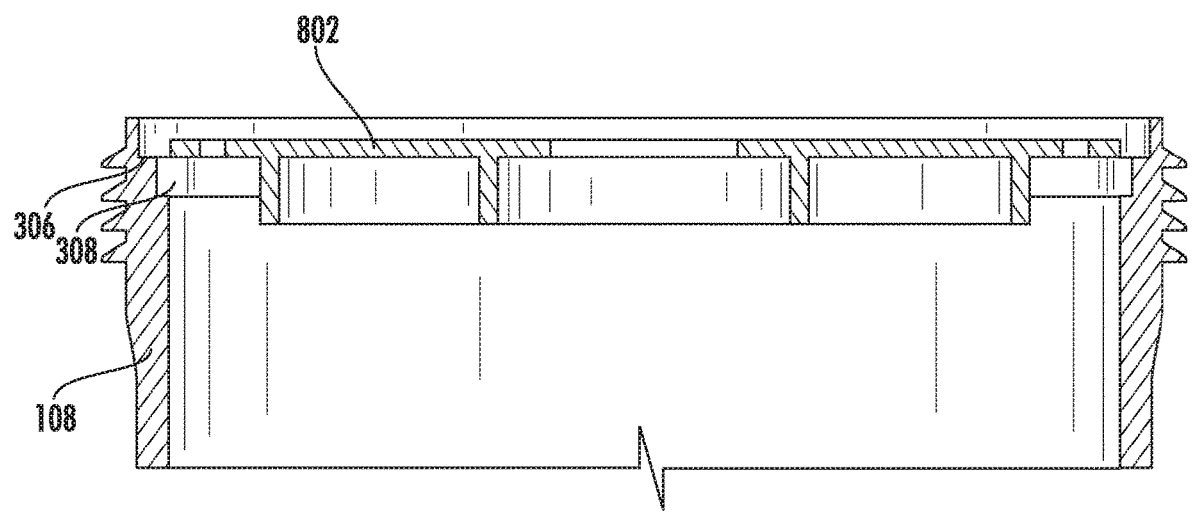

FIGS. 8D and 8E each show different views of the first endplate 802 positioned within the shell housing 108 as described above with respect to FIG. 8A. As shown in FIGS. 8D and 8E, the first endplate 802 is inscribed with the undulating pattern that matches the undulated wall 308 of the shell housing 108 such that the first endplate 802 rests on the gasket retaining lip 306 of the shell housing 108. In this arrangement, the first endplate 802 only contacts the innermost edges of the undulating pattern of the undulated wall 308. In some arrangements, the first endplate 802 may form a seal with the shell housing 108.

Figure 9:
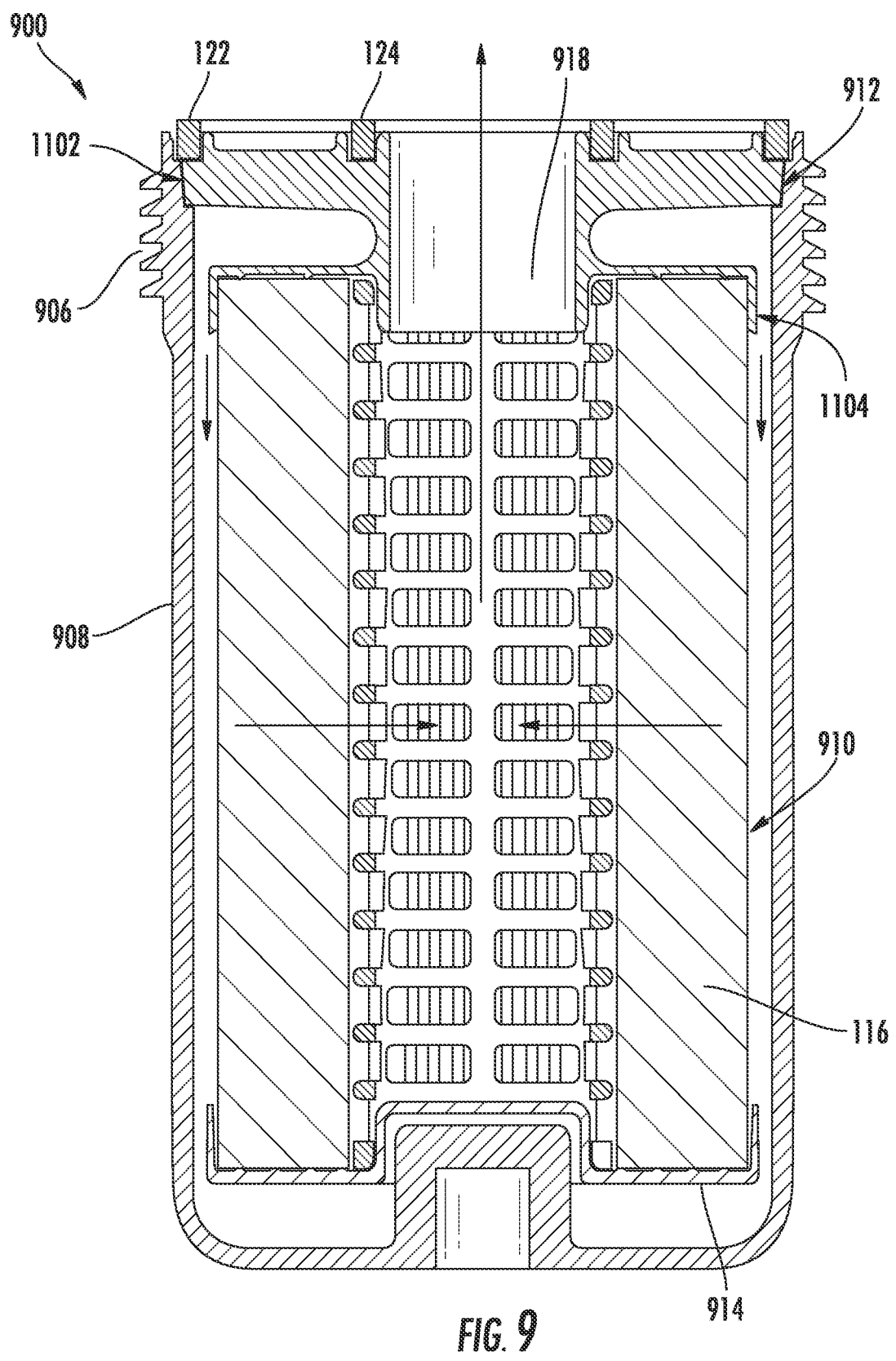
FIG. 9 shows a cross-sectional view of a filtration system according to an example embodiment.

Referring to FIG. 9, a cross-sectional view of a filtration system 900 is shown according to an example embodiment. The filtration system 900 may be a fuel filtration system, a lubricant filtration system, a hydraulic fluid filtration system, a water filtration system, or the like. The filtration system 900 is similar to the filtration system 100 of FIG. 1. A difference between the filtration system 900 and the filtration system 100 is the integration of a nutplate on the first endplate of the filtration system 900. Similarly, the first endplate 912 may be used in place of the first endplate 112 in the same manner as described above with respect to the filtration system 100. Accordingly, like numbering is used to designate similar components between the filtration system 100 and the components shown in FIGS. 9, 10A, 10B, 11, 12A, 12B, and 13 of the filtration system 900. As shown in FIG. 9, the filtration system 900 includes a shell housing 908 and a filter element 910.

The shell housing 908 is substantially cylindrical in shape having an open top end adjacent to first endplate 912 and a closed bottom end opposite the open top end. The bottom end includes a protrusion to assist in removal of the shell housing 908 from the filter element 910 and/or filtration system 900. In some arrangements, the closed bottom end includes a closeable drain opening, a sensor port, or another opening that can be selectively sealed. The shell housing 908 includes a threaded member 906 formed around the top end of the shell housing 908. The threaded member 906 is configured to threadedly engage with a filter housing component (e.g., a filter mounting head) of the filtration system 900. In some embodiments, the shell housing 908 and the threaded member 906 are separate components.

A filter element 910 is installed in the filtration system 900. The filter element 910 is received in a central compartment formed by the shell housing 908. The filter element 910 includes a first endplate 912, a second endplate 914, and filter media 116 positioned between the first endplate 912 and the second endplate 914. The filter media 116 is arranged in a cylindrical manner between the first endplate 912 and the second endplate 914. The first endplate 912 includes a nutplate portion 1102 integrated with an endplate portion 1104 such that the top surface of the first endplate 912 is the nutplate portion 1102 and the bottom surface is an endplate portion 1104 vertically spaced away from the nutplate portion 1102 and structured to attach to the filter media 116. As will be appreciated, incorporating an integrated nutplate portion 1102 on an endplate portion 1104 to form the first endplate 912 of the filter element 910 reduces the need for additional components for interfacing with and sealing with the shell housing 908. As shown in FIG. 9, the first endplate 912 is an open endplate that includes a central opening 918 in fluid communication with an outlet. The second endplate 914 is a closed endplate. The first endplate 912 includes at least one inlet opening in fluid communication with an inlet. In some arrangements, one or both of the first endplate 912 and second endplate 914 may include raised tabs extending from a surface. The tabs may be evenly spaced at the same radius from a center point of the first endplate 912 and second endplate 914 such that the tabs fall along the circle defined by the radius and the center point.

The filtration system 900 includes an outer seal member 122 and an inner seal member 124. The outer seal member 122 is supported in a U-shaped channel formed by the first endplate 912 and the shell housing 908 (e.g., as shown in FIG. 9, which shows a cross-sectional view of the interaction between the first endplate 912 and the shell housing 908). The inner seal member 124 is supported in a U-shaped channel formed by projections on the first endplate 912. Specifically, the inner seal member 124 is supported by the inner gasket retaining walls 1216 and the inner gasket retaining lip 1124 of the first endplate 1412. When the filter element 910 and the shell housing 908 are installed in the filtration system 900 (e.g., as shown in FIG. 9), the outer seal member 122 and inner seal member are pressed against a cover or a filter head and form seals. In some embodiments, the shell housing 908 and the nutplate portion 1102 of the first endplate 912 interlock to form the outer seal member 122. In some arrangements, a space defined between the outer seal member 122 and the inner seal member 124 is in fluid communication with the inlet and the inlet openings. The space inside of the inner seal member 124 is in fluid communication with the outlet and the central opening 918. Accordingly, when the filter element 910 is installed in the filtration system (as shown in FIG. 9), fluid to be filtered flows through the inlet, through the inlet openings, through the filter media 116 in an outside-in flow direction, out the central opening 918, and out the outlet as shown by the flow arrows of FIG. 9.

As described in further detail below with respect to FIGS. 10A through 13, the shell housing 908 and the first endplate 912 include matching undulated surfaces that mesh when the filter element 910 is installed in the shell housing 908, Expanding generally, the nutplate portion 1102 of the first endplate 912 includes a top nutplate surface 1220 and a bottom nutplate surface 1229, with the undulated wall 1110 disposed between the top nutplate surface 1220 and a bottom nutplate surface 1229. The matching undulated surfaces include a plurality of curves or shapes. The matching undulated surfaces prevent the filter element 910 from rotating with respect to the shell housing 908 during installation of the shell housing 908 to the filter mounting head or other filter housing component. Additionally, the undulated surface of the shell housing 908 prevents a non-authorized filter element (e.g., a filter element without the matching undulated surface) from being installed in the shell housing 908 and ultimately installed in the filtration system 900.

Figure 10A:
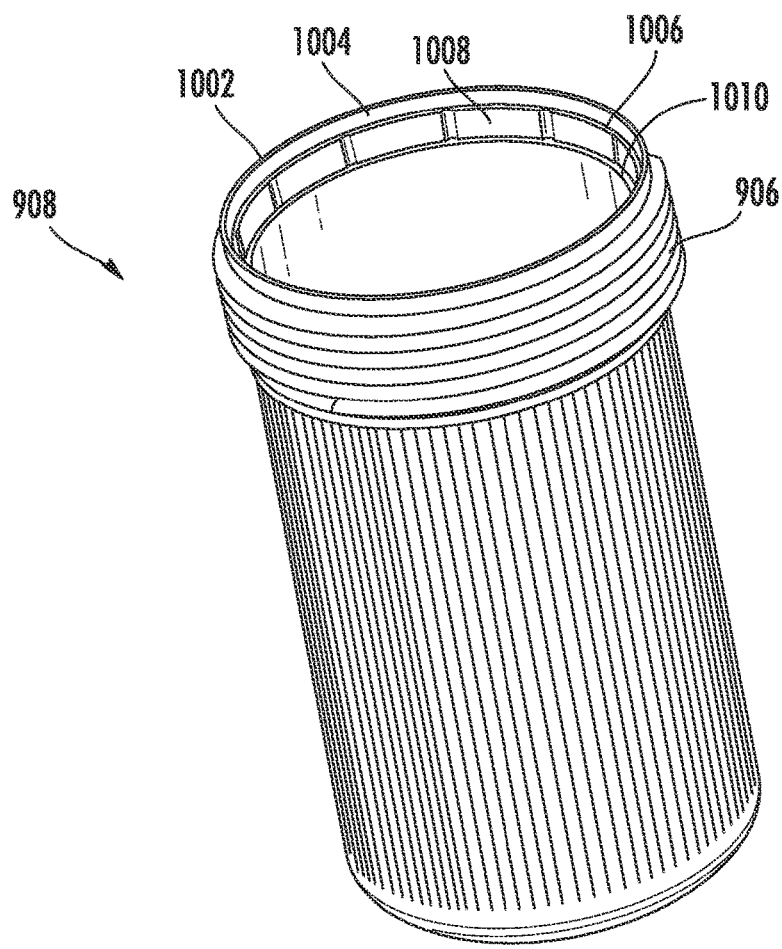
FIG. 10A shows a perspective view of the shell housing of the filtration system of FIG. 9.
Figure 10B:
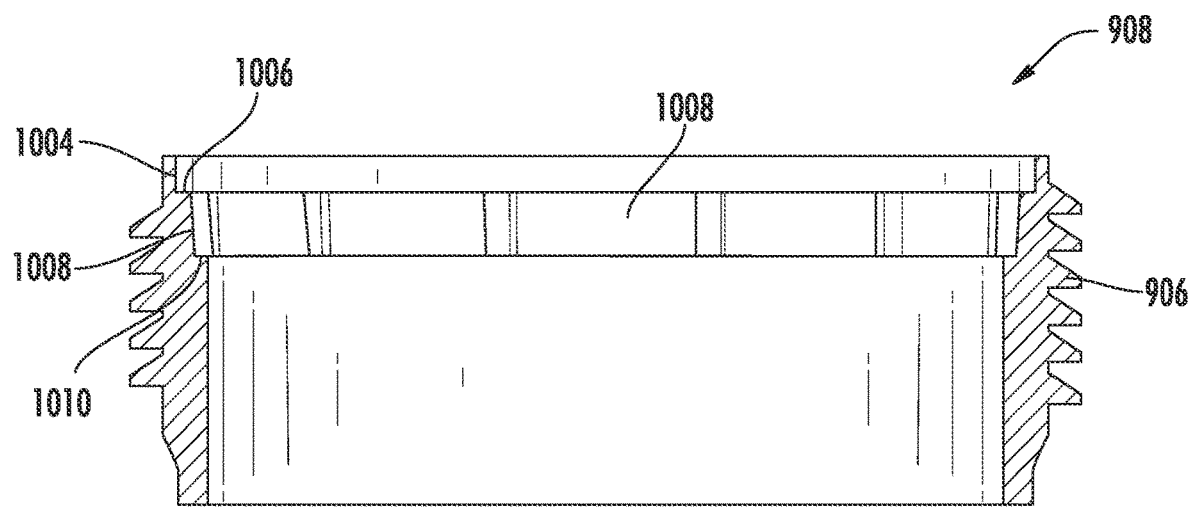
FIG. 10B shows a cross-sectional view of a portion of the shell housing of the filtration system of FIG. 9.

Referring to FIGS. 10A and 10B, views of the shell housing 908 are shown. FIG. 10A shows a perspective view of the shell housing 908. FIG. 10B shows a cross-sectional view of the top portion of the shell housing 908 shown in FIG. 10A. As described above with respect to FIG. 9, the shell housing 908 includes an open top end. The open top end is defined by a top surface 1002, a gasket retaining wall 1004, a gasket retaining lip 1006, an undulated wall 1008, and an endplate retaining lip 1010. In some arrangements, the top surface 1002, the gasket retaining lip 1006, and the endplate retaining lip 1010 are parallel, or substantially parallel, surfaces. In some arrangements, the gasket retaining wall 1004 and the undulated wall 1008 are perpendicular, or substantially perpendicular, to the top surface 1002, the gasket retaining lip 1006, and/or the endplate retaining lip 1010. The gasket retaining wall 1004 and the gasket retaining lip 1006 define a first portion of the U-shaped channel (a first half of the U-shaped channel in one embodiment) that receives the outer seal member 122 (as described above with respect to FIG. 9).

The undulated wall 1008 and the endplate retaining lip 1010 receive the first endplate 912 when the filter element 910 is installed in the shell housing 908. The undulated wall 1008 defines an inner circumferential uneven surface such that only filter elements with a complimentary undulated wall (e.g., the undulated wall 1110 of the first endplate 912) can be retained in the shell housing 908. The undulated pattern that defines the undulated wall 1008 may be continuous or intermittent throughout the inner circumference of the undulated wall 1008. In some embodiments, and as shown in FIG. 10A, the undulated wall 1008 includes twelve replications of the undulated pattern (e.g., extrusion) extruded axially about the center of the shell housing 908 with a plurality of axial notches (e.g., curved extrusions) in-between each replication of the undulated pattern (although other numbers of replications could also be used). As used herein, "undulated" or "undulating" may refer to a repeating pattern or non-repeating pattern that may follow a wave pattern (e.g., a sinusoidal pattern), a flower pattern, a triangular pattern, or any other pattern such that a mating pattern can mesh with the undulated or undulating pattern.

Figure 11:
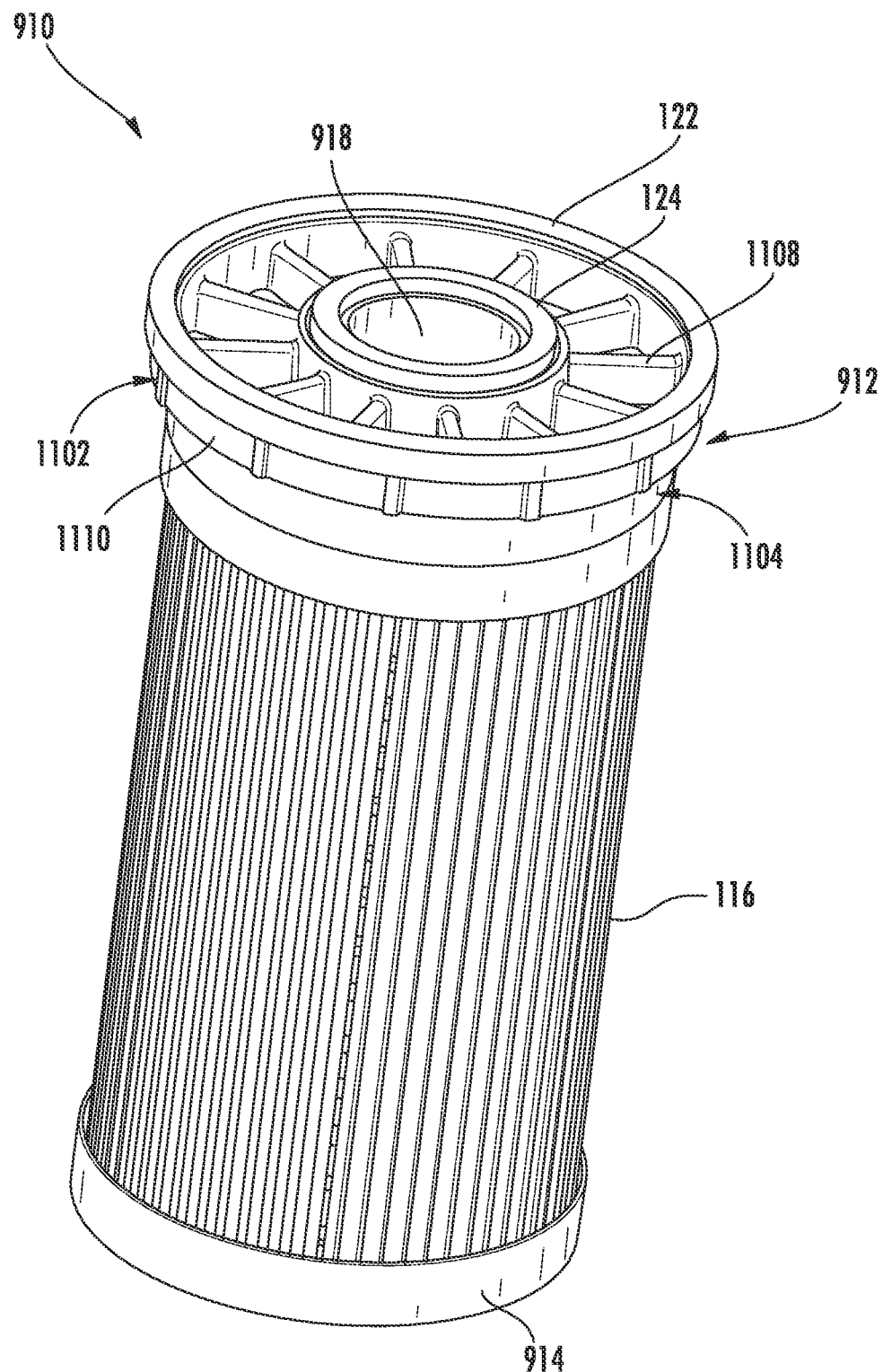
FIG. 11 shows a perspective view of the filter element of the filtration system of FIG. 9.
Figure 12A:
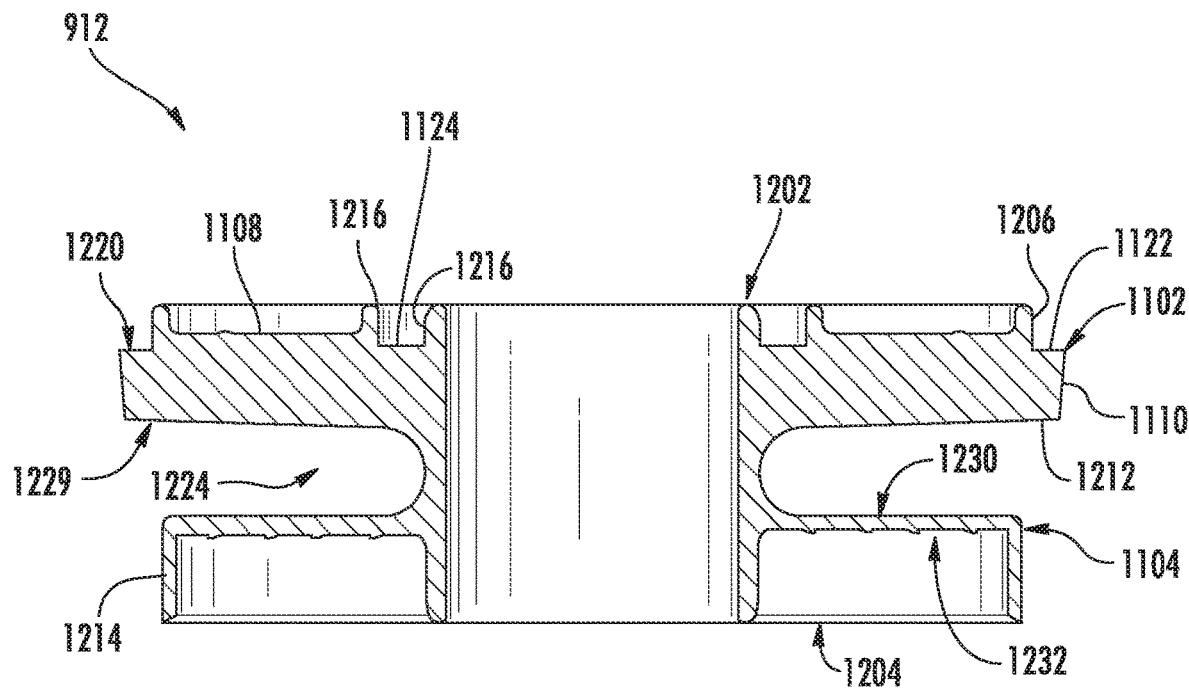
FIG. 12A shows a cross-sectional view of the first endplate of the filter element of the filtration system of FIG. 9.

FIG. 11 shows a perspective view of the filter element 910 of the filtration system 900 of FIG. 9. As described above with respect to FIG. 9, the filter element 910 includes a nutplate portion 1102 integrally formed on an endplate portion 1104 to form the first endplate 912. The nutplate portion 1102 and the endplate portion 1104 may be formed in a single injection shot. In some embodiments, the nutplate portion 1102 is a different color from the endplate portion 1104. The nutplate portion 1102 includes a plurality of ribs 1108, an outer gasket retaining lip 1122 (as shown in FIG. 12A), an outer gasket retaining wall 1206, an inner gasket retaining lip 1124 (as shown in FIG. 12A), inner gasket retaining walls 1216, and an undulated wall 1110. In some embodiments, the plurality of ribs 1108 assist in facilitating the installation of the filter element 910 into the shell housing 908. In some arrangements, the space defined between the plurality of ribs 1108 are inlet openings in fluid communication with an inlet, such that fluid to be filtered flows through the inlet, through the inlet openings, and into the filter media 116. The undulated wall 1110 includes an undulating or repeating pattern that mesh with the matching undulating or repeating pattern on the filter housing component (e.g., the undulated wall 1008 of the shell housing 908). The two undulating or repeating patterns "mesh" when the two patterns engage and lock in a similar manner as the teeth of two meshing gears thereby preventing substantial rotation of the first endplate 912 with respect to the shell housing 908 (i.e., preventing the endplate from rotating with respect to the filter housing component by more than five degrees in a given direction).

Figure 12B:
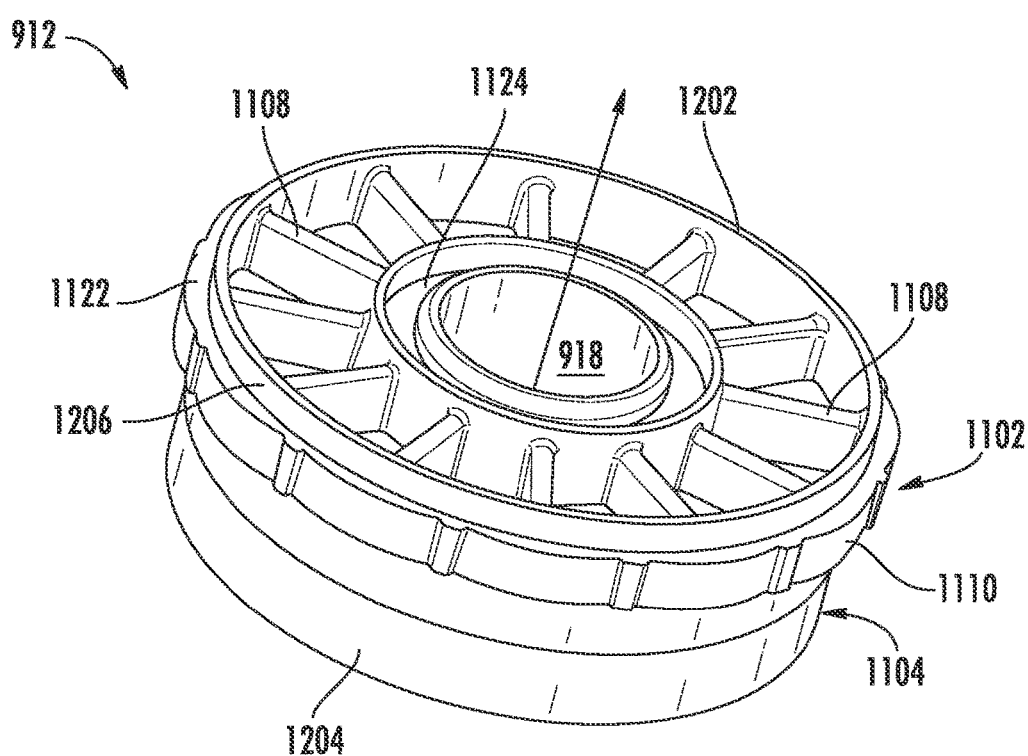
FIG. 12B shows a perspective view of the first endplate of the filter element of the filtration system of FIG. 9.

Referring to FIGS. 12A and 12B, views of the first endplate 912 are shown. FIG. 12A shows a cross-sectional view of the first endplate 912. FIG. 12B shows a perspective view of the first endplate 912. The first endplate 912 includes a top surface 1202 and a bottom surface 1204. The top surface 1202 and bottom surface 1204 are parallel, or substantially parallel, to and displaced from each other. The top surface 1202 includes the nutplate portion 1102 of the first endplate 912. The bottom surface 1204 includes the endplate portion 1104 of the first endplate 912. The nutplate portion 1102 of the first endplate 912 includes an outer gasket retaining wall 1206 extending from the top surface 1202, the outer gasket retaining lip 1122, inner gasket retaining walls 1216 extending from the top surface 1202, the inner gasket retaining lip 1124, an undulated wall 1110, and a housing support lip 1212. In some arrangements, the top surface 1202, the outer gasket retaining lip 1122, the inner gasket retaining lip 1124, the housing support lip 1212, and the bottom surface 1204 are all parallel, or substantially parallel, to each other. In some arrangements, the outer gasket retaining wall 1206, the inner gasket retaining walls 1216, and the undulated wall 1110 are perpendicular, or substantially perpendicular, to the top surface 1202, the bottom surface 1204, the gasket retaining lip 1208, and/or the housing support lip 1212. The outer gasket retaining wall 1206 and the outer gasket retaining lip 1122 define a second half of the U-shaped channel that receives the outer seal member 122 (as described above with respect to FIGS. 9 and 11).

The undulated wall 1110 and the housing support lip 1212 are sized and shaped to be supported by the undulated wall 1008 and the endplate retaining lip 1010 of the shell housing 908 when the filter element 910 is installed in the shell housing 908. The undulated wall 1110 defines an outer circumferential uneven surface such is complimentary with undulated wall 1008 of the shell housing 908. The undulated pattern that defines the undulated wall 1008 may be continuous or intermittent throughout the inner circumference of the undulated wall 1008. The undulated pattern may follow a wave pattern, a flower pattern, a triangular pattern, or the like so long as the undulated patter of the undulated wall 1110 is complimentary with the undulated pattern of the undulated wall 1008. In some embodiments, and as shown in FIG. 12B, the undulated wall 1110 includes twelve replications of the undulated pattern (e.g., extrusion) extruded axially about the center of the nutplate portion 1102 of the first endplate 912 that are complementary to twelve replications of the undulated pattern extruded axially about the center of the shell housing 908 on the undulated wall 1008 (with other numbers of replications being used if other replications are used for the undulated pattern extruded axially about the center of the shell housing 908 on the undulated wall 1008).

The endplate portion 1104 includes a top endplate surface 1230 that is parallel, or substantially parallel, to and displaced from a bottom endplate surface 1232, The endplate portion 1104 includes an axially protruding flange 1214 extending away from the bottom endplate surface 1232 toward the second endplate 914, As will be appreciated, the top surface 1202, the bottom surface 1204, the top nutplate surface 1220, the bottom nutplate surface 1229, the top endplate surface 1230, and the bottom endplate surface 1232 are parallel, or substantially parallel, to each other. Additionally, the top surface 1202 of the first endplate 912 is a circumferential protrusion extending away from and around the top nutplate surface 1220. As shown in FIG. 12A, the top nutplate surface 1220 is displaced axially away from the bottom nutplate surface 1229 by a greater distance than the axial distance between the top endplate surface 1230 and the bottom endplate surface 1232. A space 1224 is formed between the bottom nutplate surface 1229 and the top endplate surface 1230. The nutplate portion 1102 and the endplate portion 1184 are integrated such that the fluid flows through the top surface 1202 of the first endplate 912, through the openings between the plurality of ribs 1108 on the top nutplate surface 1220, into the space 1224, and around the top endplate surface 1230 and the flange 1214 to contact the filter media 116. In some embodiments, the space 1224 is configured to control inlet fuel flow through the first endplate 912 towards the filter media 116.

Figure 13:
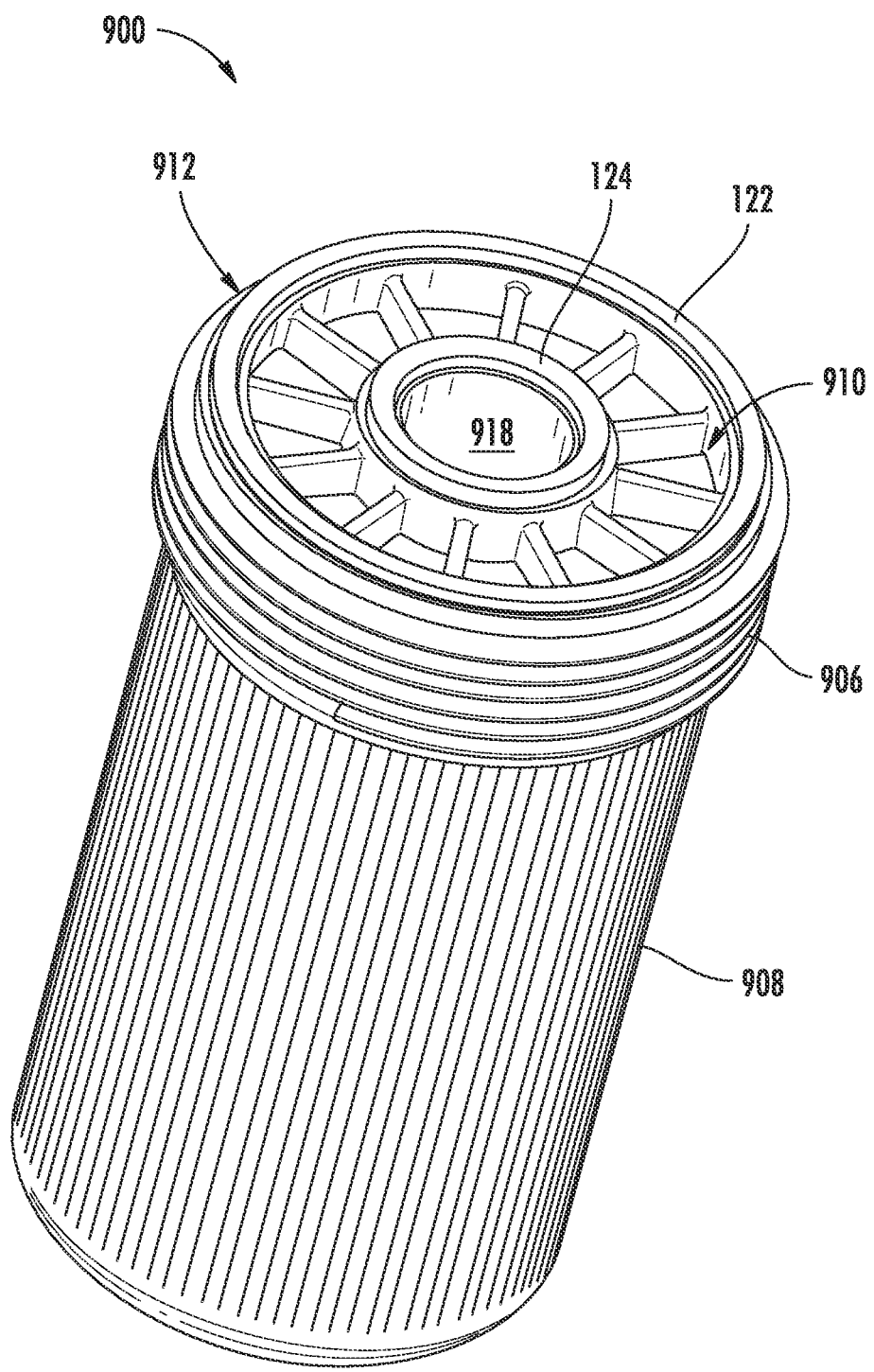
FIG. 13 shows a perspective view of the first endplate installed in the shell housing of the filtration system of FIG. 9.

Accordingly, since the filter element 910 is an authorized filter element, the first endplate 912 can be received in the shell housing 908 as shown in the filtration system 900 of FIG. 13. When the filter element 910 is installed in the shell housing 908, the undulated wall 1110 of the first endplate 912 meshes with the undulated wall 1008 of the shell housing 908 such that the first endplate 912 (and thus the filter element 910) cannot be rotated with respect to the shell housing 908. Further, when the filter element 910 is installed in the shell housing 908, the first endplate 912 and the shell housing 908 form a U-shaped channel that receives the outer seal member 122. The outer seal member 122 is supported by the outer gasket retaining wall 1206, the outer gasket retaining lip 1122, the gasket retaining wall 1004, and the gasket retaining lip 1006. When the filter element 910 is installed in the filtration system 100, the outer seal member 122 will undergo compression as it is pressed between a filter housing component (e.g., filter mounting head) and the U-shaped channel that causes the outer seal member 122 to press against the walls of the U-shaped channel and the filter housing component. In some arrangements, the walls of the U-shaped channel are at least two-thirds the height of the outer seal member 122.

If a technician attempts to insert a non-authorized filter element into the shell housing 908 (e.g., a filter element that does not include a first endplate having the undulated wall 1110), the non-authorized filter element will not fit in the shell housing 908. For example, a first endplate of a non-authorized filter element will not slide all the way in to the shell housing 908 because the pattern of the undulated wall 1008 prevents the unauthorized first endplate from sliding into the shell housing 908. Accordingly, the non-authorized filter element is raised from a fully installed position by the height of the undulated wall 1008, and sits above the top of the undulated wall 1008 by the height of the unauthorized first endplate. The height is sufficiently large to allow the unauthorized first endplate to protrude above the top surface 1002 of the shell housing 908. Since the unauthorized first endplate is raised, the unauthorized first endplate comes into contact with a filter mounting head before the threaded connection between the shell housing 108 and the filter mounting head is engaged (and before any seals form between the unauthorized first endplate and the filter mounting head), which prevents the unauthorized filter element from being installed in the filtration system 900. If a filter element is not installed in the filtration system 900, any corresponding system associated with the filtration system 900 (e.g., an internal combustion engine) may be prevented from starting.

Figure 14:
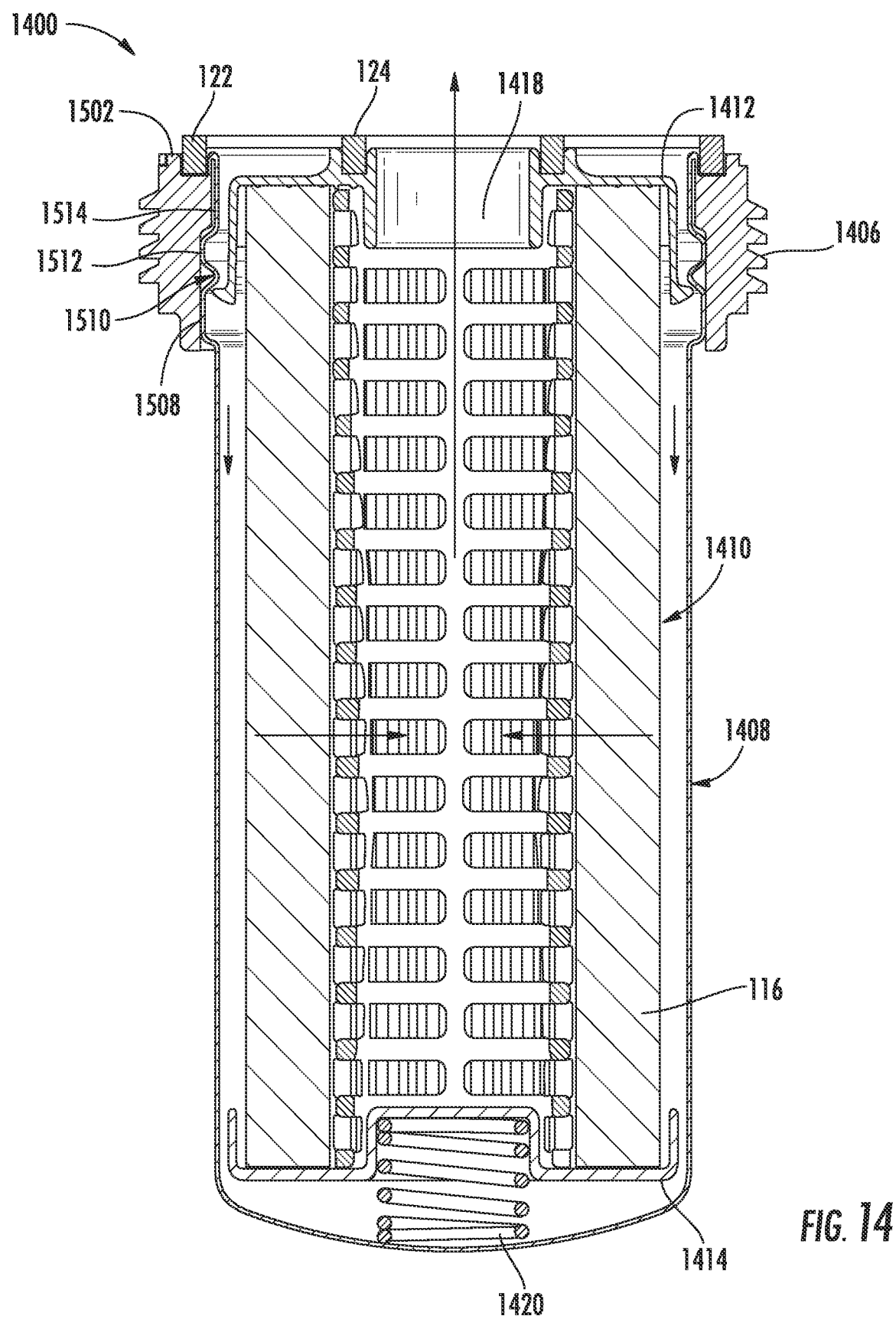
FIG. 14 shows a cross-sectional view of a filtration system according to another example embodiment.

Turning to FIG. 14, a cross-sectional view of a filtration system 1400 is shown according to an example embodiment. The filtration system 1400 may be a fuel filtration system, a lubricant filtration system, a hydraulic fluid filtration system, a water filtration system, or the like. The filtration system 1400 is similar to the filtration system 100 of FIG. 1. A difference between the filtration system 1400 and the filtration system 100, is repeating pattern of the filter housing that meshes with a complementary pattern on an endplate of the filter element. Specifically, the pattern on the endplate includes mesh protrusions (e.g., snap fingers) that interlock (e.g., snap) with a lip formed on the inside of the filter housing. Similarly, the first endplate 1412 may be used in place of the first endplate 112 in the same manner as described above with respect to the filtration system 100. In some embodiments, the filtration system 1400 may include fingers spaced radially along the outside of the endplate (or a nutplate) to interlock with a shell housing that includes a corresponding set of slots that the fingers might interlock with. Accordingly, like numbering is used to designate similar components between the filtration system 100 and the components shown in FIGS. 14, 15A, 15B, and 16. As shown in FIG. 14, the filtration system 1400 includes a shell housing 1408 and a filter element 910.

The shell housing 1408 is substantially cylindrical in shape having an open top end adjacent to first endplate 912 and a closed bottom end opposite the open top end. The bottom end includes a biasing member (e.g., spring) 1420 between the bottom end and a location to receive the filter element 1410. The biasing member 1420 is structured to facilitate the "snap-in" installation of the filter element 1410 into the shell housing 1408 and applies a biasing force of the filter element 1410 to ensure engagement of the filter element protruding wall with a complementary surface of the shell housing 1408. In some arrangements, the closed bottom end includes a closeable drain opening, a sensor port, or another opening that can be selectively sealed. The shell housing 1408 is structured to engage a threaded member 1406 (e.g., collar) formed around the top end of the shell housing 1408. The threaded member 1406 is configured to snap fit onto the shell housing 1408 and threadedly engage with a filter housing component (e.g., a filter mounting head) of the filtration system 1400. In some embodiments, the shell housing 1408 and the threaded member 1406 are formed as one component. Beneficially, the threaded member 1406 and shell housing 1408 are locked together to impede vertical movement and rotation between the threaded member 1406 and the shell housing 1408.

A filter element 1410 is installed in the filtration system 1400. The filter element 1410 is received in a central compartment formed by the shell housing 1408. The filter element 1410 includes a first endplate 1412, a second endplate 1414, and filter media 116 positioned between the first endplate 1412 and the second endplate 1414. The filter media 116 is arranged in a cylindrical manner between the first endplate 1412 and the second endplate 1414. As shown in FIG. 14, the first endplate 1412 is an open endplate that includes a central opening 1418 in fluid communication with an outlet. The second endplate 1414 is a closed endplate. The first endplate 1412 includes at least one inlet opening in fluid communication with an inlet. In some arrangements, one or both of the first endplate 1412 and second endplate 1414 may include raised tabs extending from a surface. The tabs may be evenly spaced at the same radius from a center point of the first endplate 1412 and second endplate 1414 such that the tabs fall along the circle defined by the radius and the center point.

The filtration system 1400 includes an outer seal member 122 and an inner seal member 124. The outer seal member 122 is supported in a U-shaped channel formed in the shell housing 1408 (e.g., as shown in FIG. 14, which shows a cross-sectional view of the channel around the outside of the shell housing 1408). The inner seal member 124 is supported in a U-shaped channel formed by projections on the first endplate 1412. Specifically, the inner seal member 124 is supported by the inner gasket retaining walls 1616 and the inner gasket retaining lip 1624 of the first endplate 1412. When the filter element 1410 and the shell housing 1408 are installed in the filtration system 1400 (e.g., as shown in FIG. 14), outer seal member 122 and inner seal member are pressed against a cover or a filter head and form seals. In some arrangements, a space defined between the outer seal member 122 and the inner seal member 124 is in fluid communication with the inlet and the inlet openings. The space inside of the inner seal member 124 is in fluid communication with the outlet and the central opening 1418. Accordingly, when the filter element 1410 is installed in the filtration system (as shown in FIG. 14), fluid to be filtered flows through the inlet, through the inlet openings, through the filter media 116 in an outside-in flow direction, out the central opening 1418, and out the outlet as shown by the flow arrows of FIG. 14.

As described in further detail below with respect to FIGS. 15A, 15B, and 16, the shell housing 1408 and the first endplate 1412 include complementary (e.g., matching) surfaces that mesh when the filter element 1410 is installed in the shell housing 1408. The matching surfaces include at least one radially protruding wall around an outside surface of the first endplate 1412. The matching surfaces facilitate a snap fit of the filter element 1410 with respect to the shell housing 1408 during installation of the shell housing 1408 to the filter mounting head or other filter housing component. Once installed, the matching surfaces impede the vertical movement of the filter element 1410 inside the shell housing 1408. Additionally, the surface of the shell housing 1408 prevents a non-authorized filter element (e.g., a filter element without the matching undulated surface) from being installed in the shell housing 1408 and ultimately installed in the filtration system 1400.

Figure 15B:
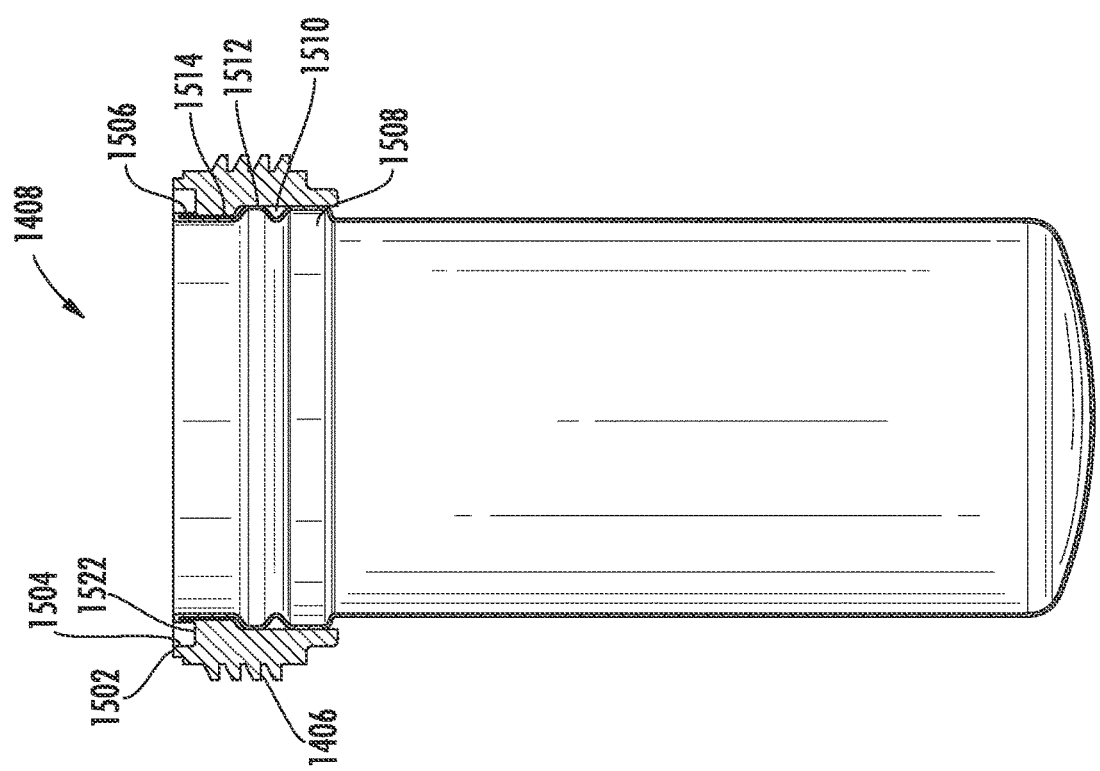
FIG. 15B shows a cross-sectional view of a portion of the shell housing of the filtration system of FIG. 14.
Figure 15A:
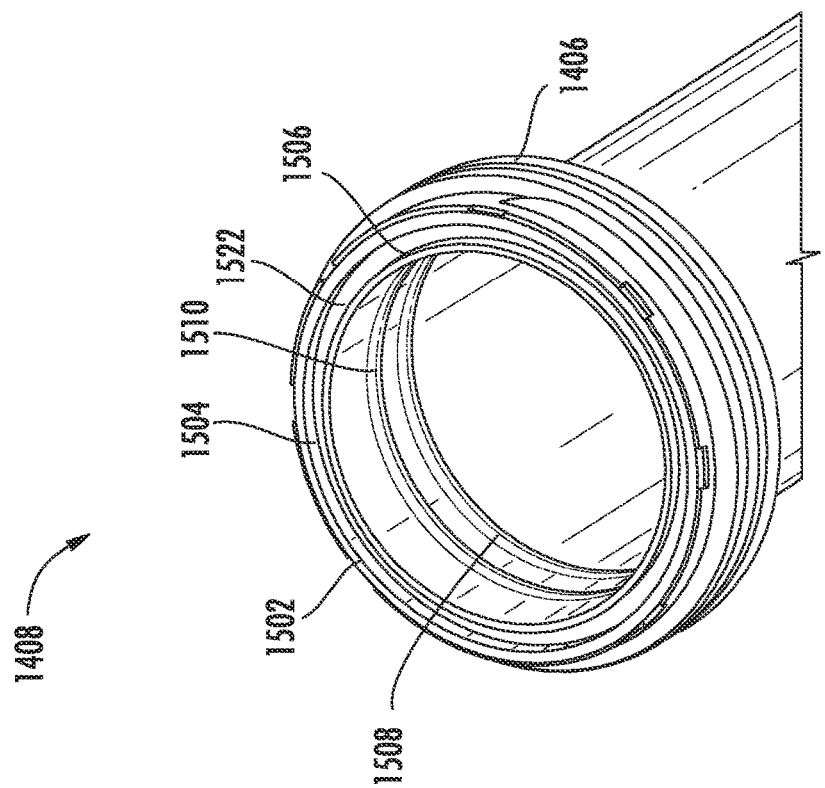
FIG. 15A shows a perspective view of the shell housing of the filtration system of FIG. 14.

Referring to FIGS. 15A and 15B, views of the shell housing 1408 are shown. FIG. 15A shows a perspective view of the shell housing 1408. FIG. 15B shows a cross-sectional view of the top portion of the shell housing 1408 shown in FIG. 15A. As described above with respect to FIG. 14, the shell housing 1408 includes an open top end. The open top end is defined by a top surface 1502, a first gasket retaining wall 1504, a gasket retaining lip 1522, a second gasket retaining wall 1506, a recessed (e.g., patterned) wall 1508, a recessed lip 1512, and an endplate retaining lip 1510. In some arrangements, the first gasket retaining wall 1504, the second gasket retaining wall 1506, and the wall 1508 are perpendicular, or substantially perpendicular, to the top surface 1502, the second gasket retaining wall 1506, and/or the endplate retaining lip 1510. Contrary to the shell housing 108 or shell housing 908, a U-shaped channel that receives the outer seal member 122 (as described above with respect to FIG. 14) is formed directly in the shell housing 1408. Specifically, the outer seal member 122 is received by a channel formed by the first gasket retaining wall 1504, the second gasket retaining wall 1506, and the gasket retaining lip 1522. The recessed wall 1508 and the endplate retaining lip 1510 receive the first endplate 1412 when the filter element 1410 is installed in the shell housing 1408. The recessed wall 1508 defines an inner circumferential recessed surface such that only filter elements with complimentary protrusions (e.g., the protruding wall 1610 of the first endplate 1412) can be retained in the shell housing 1408. The recessed pattern that defines the recessed wall 1508 may be continuous or intermittent throughout the inner circumference of the recessed wall 1508. As used herein, "recessed" may refer to a repeating pattern or non-repeating pattern that may follow a continuous pattern, a wave pattern (e.g., a sinusoidal pattern), a flower pattern, a triangular pattern, or any other pattern such that a mating pattern can mesh with the protrusion. As will be appreciated, the endplate retaining lip 1510 facilitates the protruding wall 1610 of the first endplate 1412 engaging the recessed wall 1508.

Figure 16:
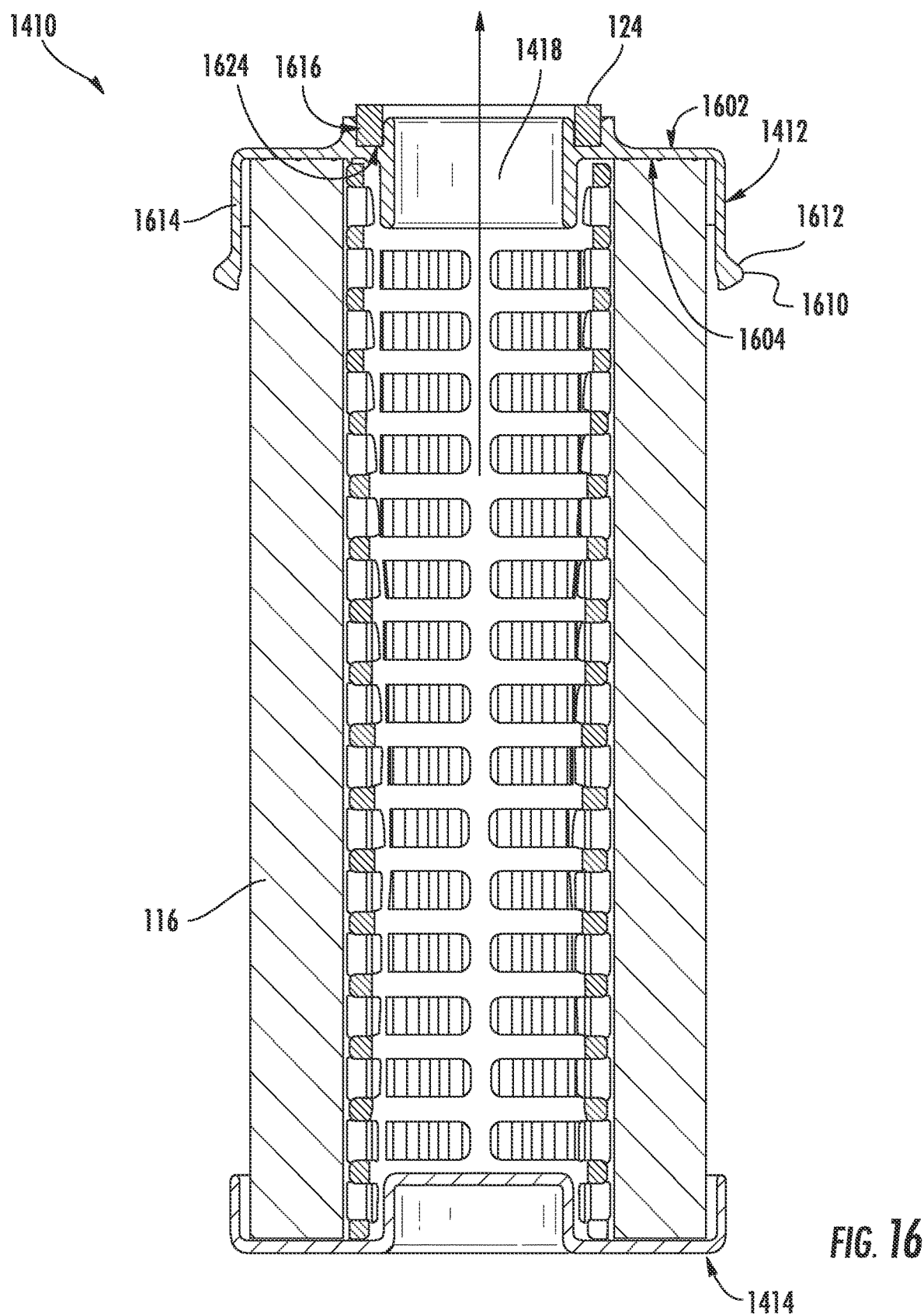
FIG. 16 shows a cross-sectional view of the filter element of the filtration system of FIG. 14.

FIG. 16 shows a perspective view of the filter element 1410 of the filtration system 1400 of FIG. 14. As described above with respect to FIG. 14, the filter element 1410 includes a first endplate 1412 with at least one radially protruding wall 1610. The first endplate 1412 includes a top surface 1602 and a bottom surface 1604. The top surface 1062 and bottom surface 1604 are parallel, or substantially parallel, and displaced from each other. The first endplate 1412 includes the inner gasket retaining walls 1616 extending from the top surface 1602, an inner gasket retaining lip 1624, and, extending downward from the top surface 1602, an axially protruding flange 1614 with a radially protruding wall 1610 along the surface of the protruding flange 1614. In some embodiments, the axially protruding flange 1614 is flexible in the radial direction toward the filter media 116. In some arrangements, the top surface 1602, the inner gasket retaining lip 1624 and the bottom surface 1604 are all parallel, or substantially parallel, to each other. In some arrangements, the inner gasket retaining walls 1616 and the axially protruding flange 1614 are perpendicular, or substantially perpendicular, to the top surface 1602, the bottom surface 1604, and the inner gasket retaining lip 1624. In some arrangements, the axially protruding flange 1614 is continuous around a circumference of the filter element 1410. In some arrangements, the radially protruding wall 1610 is continuous around a circumference of the filter element 1410. The radially protruding wall 1610 includes a shape (e.g., triangular, rectangular, obtuse, angled, etc.) that allows for the first endplate 1412 to be vertically pressed down, past the recessed lip 1512 and endplate retaining lip 1510 thereby causing the axially protruding flange 1614 to flex inward. In some embodiments, the radially protruding wall 1610 is substantially parallel to the top surface 1602, the inner gasket retaining lip 1624 and the bottom surface 1604.

Accordingly, since the filter element 1410 is an authorized filter element, the first endplate 1412 can be received in the shell housing 1408. When the filter element 1410 is installed in the shell housing 1408, the radially protruding wall 1610 of the first endplate 1412 drops into the shell housing 1408. Once the radially protruding wall 1610 is pushed below the endplate retaining lip 1510, the mesh of the shape of the radially protruding wall 1610 and the shape of the endplate retaining lip 1510 of the shell housing 1408 impedes vertical movement of the filter element 1410 with respect to the shell housing 1408. As will be appreciated, the biasing member 1420 is structured to facilitate the "snap-in" installation of the filter element 1410 into the shell housing 1408 and applies a vertical force of the filter element 1410 to ensure engagement of the radially protruding wall 1610 of the first endplate 1412 with the complementary surface of the shell housing 1408. In other words, the two repeating patterns "mesh" when the two patterns engage and lock in a similar manner as the teeth of two meshing gears thereby preventing substantial rotation of the first endplate 1412 with respect to the shell housing 1408.

As shown in FIG. 16, the radially protruding wall 1610 further includes a housing support lip 1612 that is complementary to the endplate retaining lip 1510 of the shell housing 1408 such that the engagement of the housing support lip 1612 and the endplate retaining lip 1510 impedes vertical movement of the filter element 1410 with respect to the shell housing 1408. Further, when the filter element 1410 is installed in the shell housing 1408, the outer gasket channel (e.g., the channel formed by the first gasket retaining wall 1504, the second gasket retaining wall 1506, and the gasket retaining lip 1522) receives the outer seal member 122. When the filter element 1410 is installed in the filtration system 1400, the outer seal member 122 will undergo compression as it is pressed between a filter housing component (e.g., filter mounting head) and the U-shaped channel that causes the outer seal member 122 to press against the walls of the U-shaped channel and the filter housing component. In some arrangements, the walls of the U-shaped channel are at least two-thirds the height of the outer seal member 122.

If a technician attempts to insert a non-authorized filter element into the shell housing 1408 (e.g., a filter element that does not include a first endplate having the radially protruding wall 1610), the non-authorized filter element will not fit in the shell housing 1408. For example, a first endplate of a non-authorized filter element will not slide all the way in to the shell housing 1408 because the pattern of the recessed wall 1508 prevents the unauthorized first endplate from sliding into the shell housing 1408. Accordingly, the non-authorized filter element is raised from a fully installed position by the height of the recessed wall 1508, and sits above the top of the recessed wall 1508 by the height of the unauthorized first endplate. The height is sufficiently large to allow the unauthorized first endplate to protrude above the top surface 1502 of the shell housing 1408. Since the unauthorized first endplate is raised, the unauthorized first endplate comes into contact with a filter mounting head before the threaded connection between the shell housing 108 and the filter mounting head is engaged (and before any seals form between the unauthorized first endplate and the filter mounting head), which prevents the unauthorized filter element from being installed in the filtration system 1400. If a filter element is not installed in the filtration system 1400, any corresponding system associated with the filtration system 1400 (e.g., an internal combustion engine) may be prevented from starting.

Figure 17:
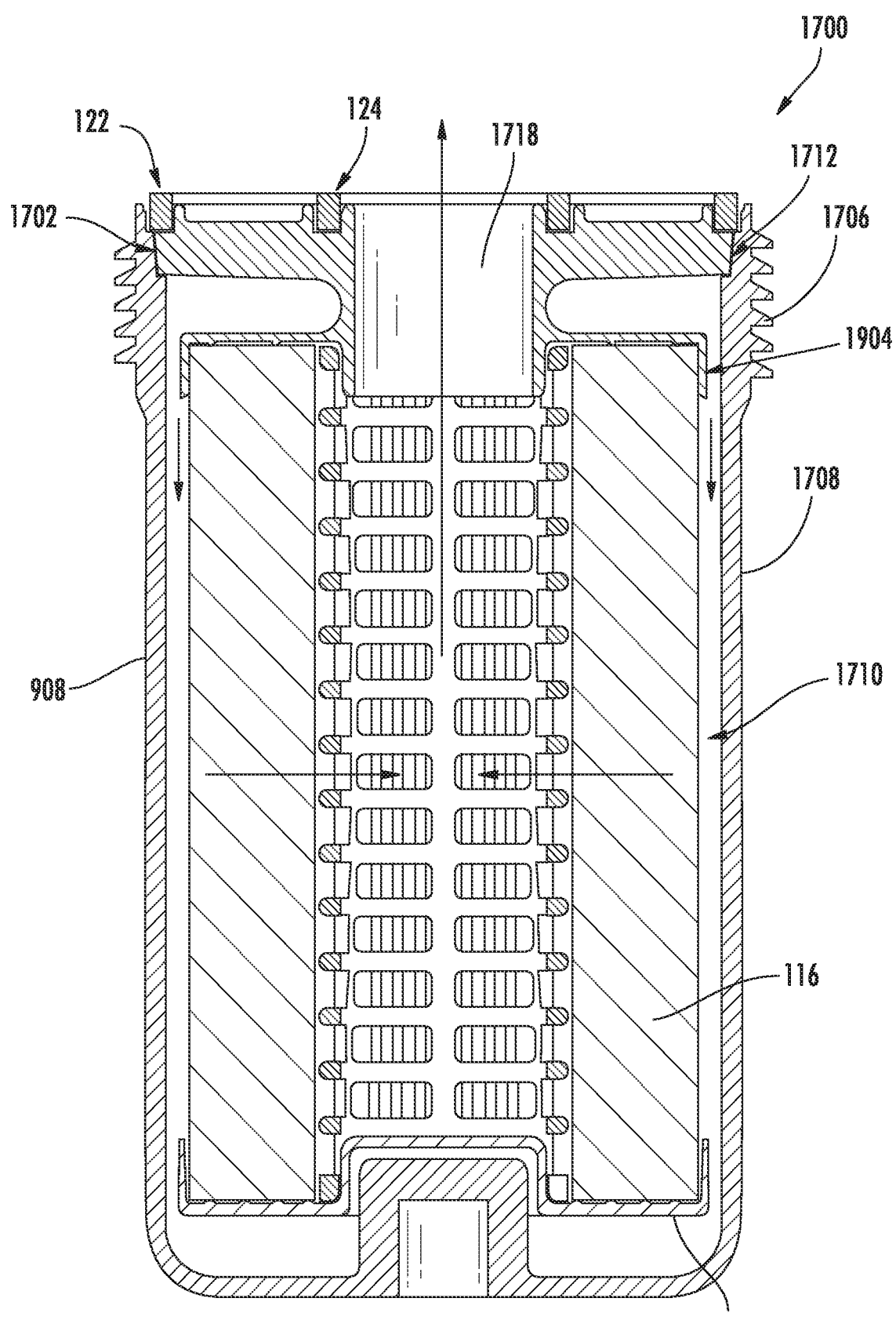
FIG. 17 shows a cross-sectional view of a filtration system according to another example embodiment.

Referring to FIG. 17, a cross-sectional view of a filtration system 1700 is shown according to another example embodiment. The filtration system 1700 may be a fuel filtration system, a lubricant filtration system, a hydraulic fluid filtration system, a water filtration system, or the like. The filtration system 1700 is similar to the filtration system 900 of FIG. 9 in many respects. A difference between the filtration system 1700 and the filtration system 900 is a modification of the undulated wall of the nutplate where the nutplate interlocks with the housing. The filtration system 1700 includes a different pattern and numerosity of replicated patters extruded axially about the center of the first endplate 1712 and shell housing 1708 compared to the filtration system 900. In some embodiments, the filtration system 1700 includes six replications of the pattern extruded axially about the center of the filtration system 1700 on the undulated walls of the shell housing 1708 and first endplate 1712, as opposed to twelve replications of the pattern extruded axially about the center of the filtration system 900 on the undulated walls of the shell housing 908 and first endplate 912. As will be appreciated, the differing undulated patterns prevents the first endplate 912 to be used in place of the first endplate 1712 with the shell housing 1708 of the filtration system 1700. Relatedly, the differing undulated patterns prevents the first endplate 1712 to be used in place of the first endplate 912 with the shell housing 908 of the filtration system 900. Accordingly, like numbering is used to designate similar components between the filtration system 900 and the components shown in FIGS. 17, 18A, 18B, 19, 20A, 20B, and 21 of the filtration system 1700. As shown in FIG. 17, the filtration system 1700 includes a shell housing 1708 and a filter element 1710.

The shell housing 1708 is substantially cylindrical in shape, having an open top end adjacent to first endplate 1712 and a closed bottom end opposite the open top end. The bottom end includes a protrusion to assist in removal of the shell housing 1708 from the filter element 1710 and/or filtration system 1700. In some arrangements, the closed bottom end includes a closeable drain opening, a sensor port, or another opening that can be selectively sealed. The shell housing 1708 includes a threaded member 1706 formed around the top end of the shell housing 1708. The threaded member 1706 is configured to engage with the threads of a filter housing component (e.g., a filter mounting head) of the filtration system 1700. In some embodiments, the shell housing 1708 and the threaded member 1706 are separate components.

A filter element 1710 is installed in the filtration system 1700. The filter element 1710 is received in a central compartment formed by the shell housing 1708. The filter element 1710 includes a first endplate 1712, a second endplate 1714, and filter media 116 positioned between the first endplate 1712 and the second endplate 1714. The filter media 116 is arranged in a cylindrical manner between the first endplate 1712 and the second endplate 1714. The first endplate 1712 includes a nutplate portion 1902 integrated with an endplate portion 1904 such that the top surface of the first endplate 1712 is the nutplate portion 1902 and the bottom surface is an endplate portion 1904 vertically spaced away from the nutplate portion 1902 and structured to attach to the filter media 116. As will be appreciated, incorporating an integrated nutplate portion 1902 on an endplate portion 1904 to form the first endplate 1712 of the filter element 1710 reduces the need for additional components for interfacing with and sealing with the shell housing 1708. As shown in FIG. 17, the first endplate 1712 is an open endplate that includes a central opening 1718 in fluid communication with an outlet. The second endplate 1714 is a closed endplate. The first endplate 1712 includes at least one inlet opening in fluid communication with an inlet. In some arrangements, one or both of the first endplate 1712 and second endplate 1714 may include raised tabs extending from a surface. The tabs may be evenly spaced at the same radius from a center point of the first endplate 1712 and second endplate 1714 such that the tabs fall along the circle defined by the radius and the center point.

The filtration system 1700 includes an outer seal member 122 and an inner seal member 124. The outer seal member 122 is supported in a U-shaped channel formed by the first endplate 1712 and the shell housing 1708 (e.g., as shown in FIG. 17, which shows a cross-sectional view of the interaction between the first endplate 1712 and the shell housing 1708). The inner seal member 124 is supported in a U-shaped channel formed by projections on the first endplate 1712. Specifically, the inner seal member 124 is supported by the inner gasket retaining walls 2016 and the inner gasket retaining lip 1924 of the first endplate 1712. When the filter element 1710 and the shell housing 1708 are installed in the filtration system 1700 (e.g., as shown in FIG. 17), the outer seal member 122 and inner seal member are pressed against a cover or a filter head and form seals. In some embodiments, the shell housing 1708 and the nutplate portion 1902 of the first endplate 1712 interlock to form the outer seal member 122. In some arrangements, a space defined between the outer seal member 122 and the inner seal member 124 is in fluid communication with the inlet and the inlet openings. The space inside of the inner seal member 124 is in fluid communication with the outlet and the central opening 1718. Accordingly, when the filter element 1710 is installed in the filtration system (as shown in FIG. 17), fluid to be filtered flows through the inlet, through the inlet openings, through the filter media 116 in an outside-in flow direction, out the central opening 918, and out the outlet as shown by the flow arrows of FIG. 17.

As described in further detail below with respect to FIGS. 18A through 21, the shell housing 1708 and the first endplate 1712 include matching undulated surfaces that mesh when the filter element 1710 is installed in the shell housing 1708. Expanding generally, the nutplate portion 1902 of the first endplate 1712 includes a top nutplate surface 2020 and a bottom nutplate surface 2029, with the undulated wall 1910 disposed between the top nutplate surface 2020 and a bottom nutplate surface 2029. The matching undulated surfaces include a plurality of curves or shapes. The matching undulated surfaces prevent the filter element 1710 from rotating with respect to the shell housing 1708 during installation of the shell housing 1708 to the filter mounting head or other filter housing component. Additionally, the undulated surface of the shell housing 1708 prevents a non-authorized filter element (e.g., a filter element without the matching undulated surface) from being installed in the shell housing 1708 and ultimately installed in the filtration system 1700.

Figure 18A:
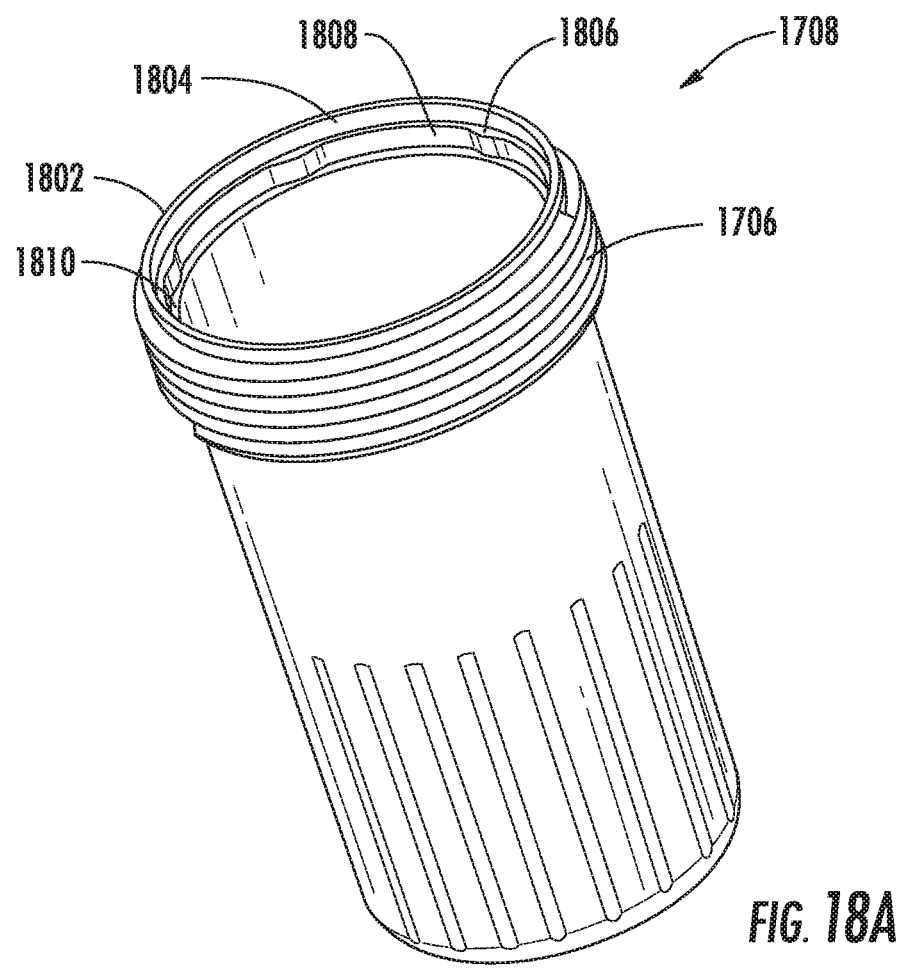
FIG. 18A shows a perspective view of the shell housing of the filtration system of FIG. 17.
Figure 18B:
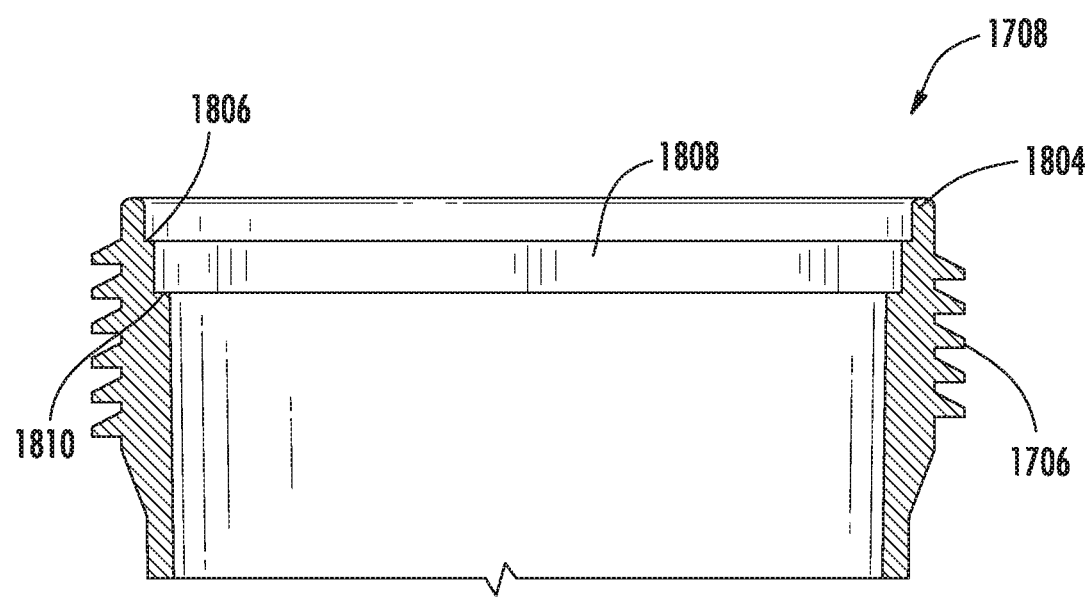
FIG. 18B shows a cross-sectional view of a portion of the shell housing of the filtration system of FIG. 17.

Referring to FIGS. 18A and 18B, views of the shell housing 1708 are shown. FIG. 18A shows a perspective view of the shell housing 1708. FIG. 18B shows a cross-sectional view of the top portion of the shell housing 1708 shown in FIG. 18A. As described above with respect to FIG. 17, the shell housing 1708 includes an open top end. The open top end is defined by a top surface 1802, a gasket retaining wall 1804, a gasket retaining lip 1806, an undulated wall 1808, and an endplate retaining lip 1810. In some arrangements, the top surface 1802, the gasket retaining lip 1806, and the endplate retaining lip 1810 are parallel, or substantially parallel, surfaces. In some arrangements, the gasket retaining wall 1804 and the undulated wall 1808 are perpendicular, or substantially perpendicular, to the top surface 1802, the gasket retaining lip 1806, and/or the endplate retaining lip 1810. The gasket retaining wall 1804 and the gasket retaining lip 1806 define a first portion of the U-shaped channel (a first half of the U-shaped channel in one embodiment) that receives the outer seal member 122 (as described above with respect to FIG. 17).

The undulated wall 1808 and the endplate retaining lip 1810 receive the first endplate 1712 when the filter element 1710 is installed in the shell housing 1708. The undulated wall 1808 defines an inner circumferential uneven surface such that only filter elements with a complimentary undulated wall (e.g., the undulated wall 1910 of the first endplate 1712) can be retained in the shell housing 1708. The undulated pattern that defines the undulated wall 1808 may be continuous or intermittent throughout the inner circumference of the undulated wall 1808. In some embodiments, and as shown in FIG. 18A, the undulated wall 1808 includes six replications of the undulated pattern (e.g., extrusion) extruded axially about the center of the shell housing 1708. As used herein, "undulated" or "undulating" may refer to a repeating pattern or non-repeating pattern that may follow a wave pattern (e.g., a sinusoidal pattern), a flower pattern, a triangular pattern, or any other pattern such that a mating pattern can mesh with the undulated or undulating pattern.

Figure 19:
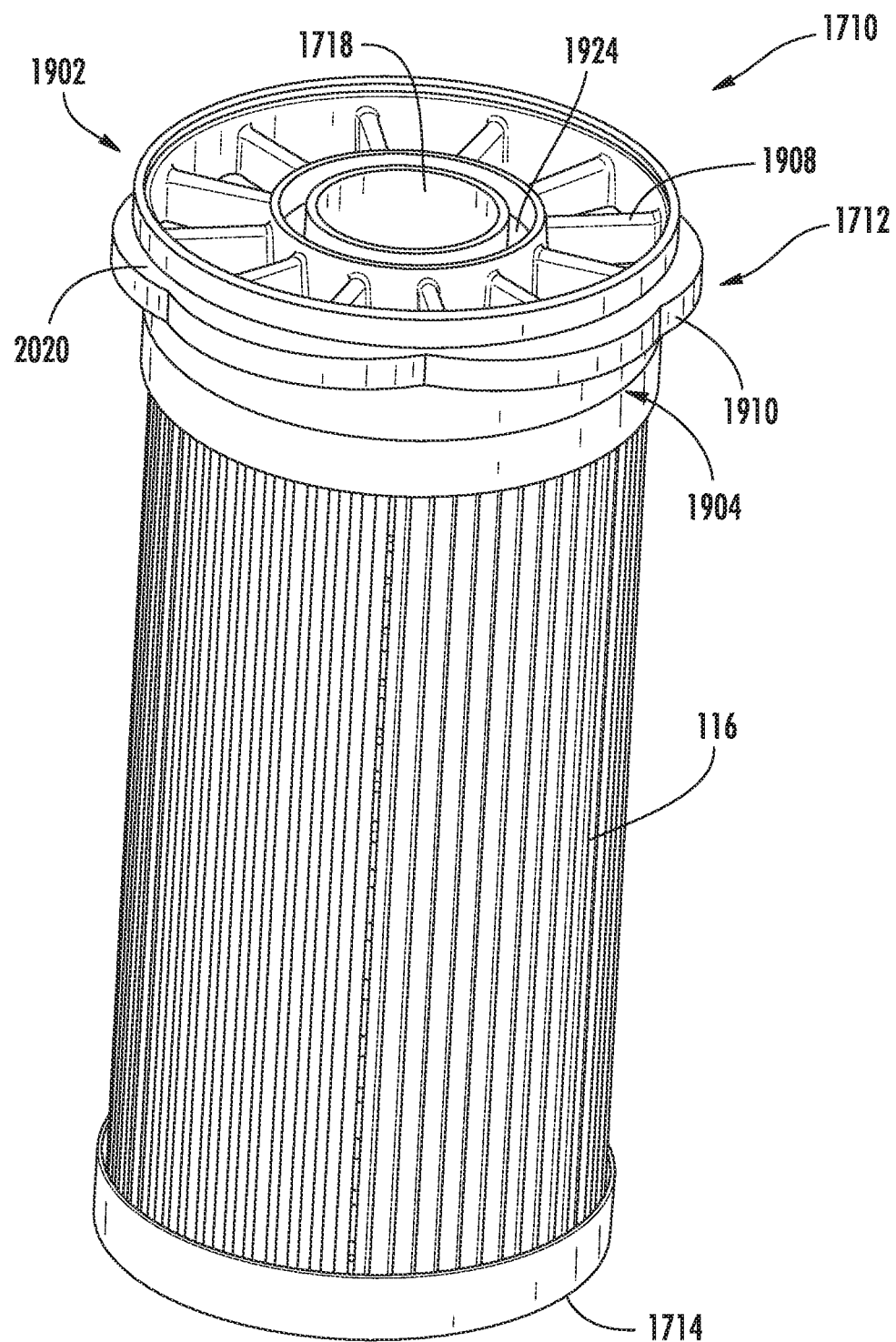
FIG. 19 shows a perspective view of the filter element of the filtration system of FIG. 17.
Figure 20A:
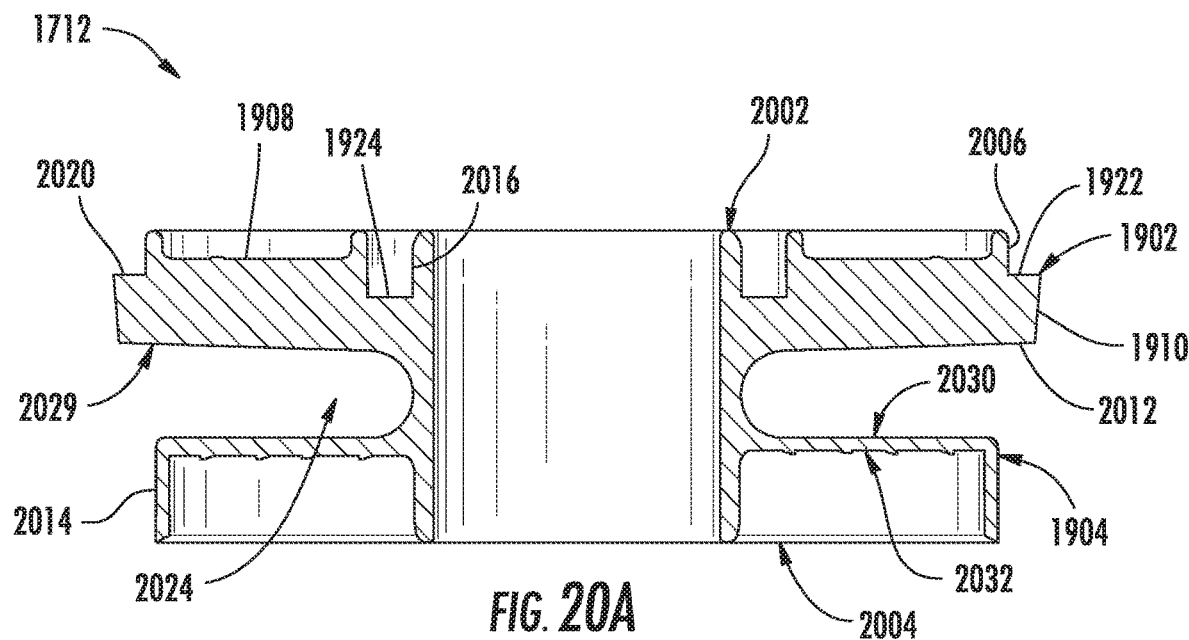
FIG. 20A shows a cross-sectional view of the first endplate of the filter element of the filtration system of FIG. 17.

FIG. 19 shows a perspective view of the filter element 1710 of the filtration system 1700 of FIG. 17. As described above with respect to FIG. 17, the filter element 1710 includes a nutplate portion 1902 integrally formed on an endplate portion 1904 to form the first endplate 1712. The nutplate portion 1902 and the endplate portion 1904 may be formed in a single injection shot. In some embodiments, the nutplate portion 1902 is a different color from the endplate portion 1904. The nutplate portion 1902 includes a plurality of ribs 1908, an outer gasket retaining lip 1922 (as shown in FIG. 20A), an outer gasket retaining wall 2006, an inner gasket retaining lip 1924 (as shown in FIG. 20A), inner gasket retaining walls 2016, and an undulated wall 1910. In some embodiments, the plurality of ribs 1908 assist in facilitating the installation of the filter element 1710 into the shell housing 1708. In some arrangements, the space defined between the plurality of ribs 1908 are inlet openings in fluid communication with an inlet, such that fluid to be filtered flows through the inlet, through the inlet openings, and into the filter media 116. The undulated wall 1910 includes an undulating or repeating pattern that mesh with the matching undulating or repeating pattern on the filter housing component (e.g., the undulated wall 1808 of the shell housing 1708). The two undulating or repeating patterns "mesh" when the two patterns engage and lock in a similar manner as the teeth of two meshing gears thereby preventing substantial rotation of the first endplate 1712 with respect to the shell housing 1708 (i.e., preventing the endplate from rotating with respect to the filter housing component by more than five degrees in a given direction).

Figure 20B:
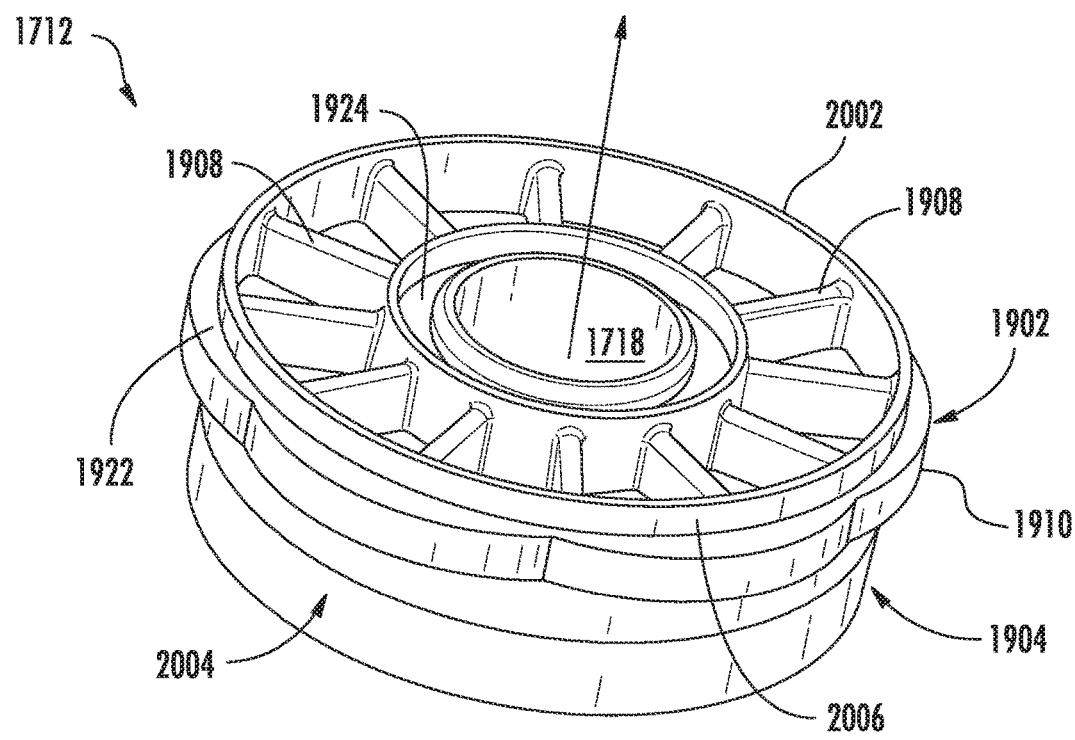
FIG. 20B shows a perspective view of the first endplate of the filter element of the filtration system of FIG. 17.

Referring to FIGS. 20A and 20B, views of the first endplate 1712 are shown. FIG. 20A shows a cross-sectional view of the first endplate 1712. FIG. 20B shows a perspective view of the first endplate 1712. The first endplate 1712 includes a top surface 2002 and a bottom surface 2004, The top surface 2002 and bottom surface 2004 are parallel, or substantially parallel, to and displaced from each other. The top surface 2002 includes the nutplate portion 1902 of the first endplate 1712. The bottom surface 2004 includes the endplate portion 1904 of the first endplate 1712. The nutplate portion 1902 of the first endplate 1712 includes an outer gasket retaining wall 2006 extending from the top surface 2002, the outer gasket retaining lip 1922, inner gasket retaining walls 2016 extending from the top surface 2002, the inner gasket retaining lip 1924, an undulated wall 1910, and a housing support lip 2012. In some arrangements, the top surface 2002, the outer gasket retaining lip 1922, the inner gasket retaining lip 1924, the housing support lip 2012, and the bottom surface 2004 are all parallel, or substantially parallel, to each other. In some arrangements, the outer gasket retaining wall 2006, the inner gasket retaining walls 2016, and the undulated wall 1910 are perpendicular, or substantially perpendicular, to the top surface 2002, the bottom surface 2004, the gasket retaining lip 2008, and/or the housing support lip 2012. The outer gasket retaining wall 2006 and the outer gasket retaining lip 1922 define a second half of the U-shaped channel that receives the outer seal member 122 (as described above with respect to FIGS. 17 and 19).

The undulated wall 1910 and the housing support lip 2012 are sized and shaped to be supported by the undulated wall 1808 and the endplate retaining lip 1810 of the shell housing 1708 when the filter element 1710 is installed in the shell housing 1708, The undulated wall 1910 defines an outer circumferential uneven surface such that is complimentary with undulated wall 1808 of the shell housing 1708. The undulated pattern that defines the undulated wall 1808 may be continuous or intermittent throughout the inner circumference of the undulated wall 1808, The undulated pattern may follow a wave pattern, a flower pattern, a triangular pattern, or the like so long as the undulated patter of the undulated wall 1910 is complimentary with the undulated pattern of the undulated wall 1808. In some embodiments, and as shown in FIG. 20B, the undulated wall 1910 includes six replications of the undulated pattern (e.g., extrusion) extruded axially about the center of the nutplate portion 1902 of the first endplate 1712 that are complementary to six replications of the undulated pattern extruded axially about the center of the shell housing 1708 on the undulated wall 1808.

The endplate portion 1904 includes a top endplate surface 2030 that is parallel, or substantially parallel, to and displaced from a bottom endplate surface 2032. The endplate portion 1904 includes an axially protruding flange 2014 extending away from the bottom endplate surface 2032 toward the second endplate 1714. As will be appreciated, the top surface 2002, the bottom surface 2004, the top nutplate surface 2020, the bottom nutplate surface 2029, the top endplate surface 2030, and the bottom endplate surface 2032 are parallel, or substantially parallel, to each other. Additionally, the top surface 2002 of the first endplate 1712 is a circumferential protrusion extending away from and around the top nutplate surface 2020. As shown in FIG. 20A, the top nutplate surface 2020 is displaced axially away from the bottom nutplate surface 2029 by a greater distance than the axial distance between the top endplate surface 2030 and the bottom endplate surface 2032. A space 2024 is formed between the bottom nutplate surface 2029 and the top endplate surface 2030. The nutplate portion 1902 and the endplate portion 1904 are integrated such that the fluid flows through the top surface 2002 of the first endplate 1712, through the openings between the plurality of ribs 1908 on the top nutplate surface 2020, into the space 2024, and around the top endplate surface 1230 and the flange 2014 to contact the filter media 116. In some embodiments, the space 2024 is configured to control inlet fuel flow through the first endplate 1712 towards the filter media 116.

Figure 21:
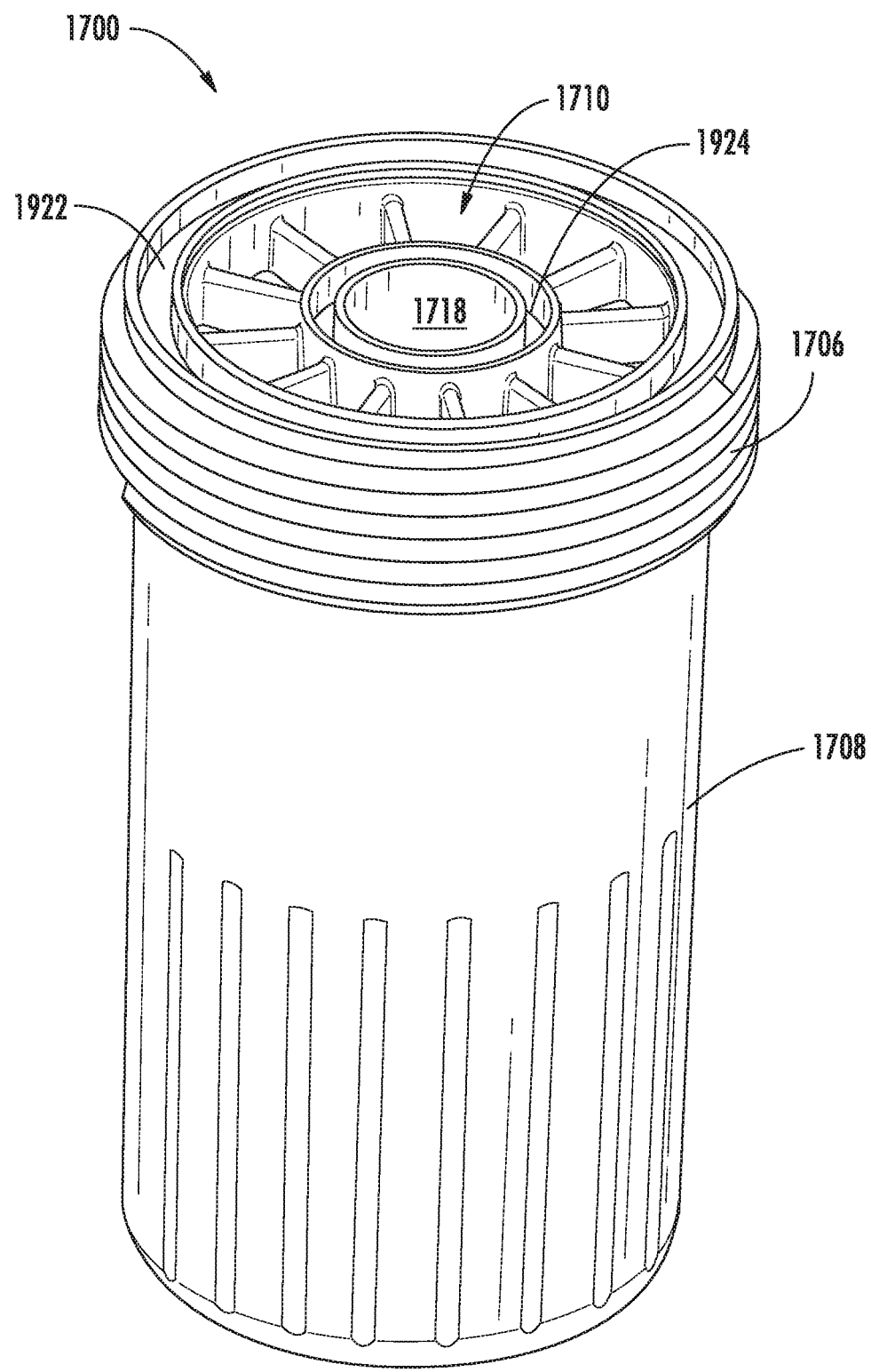
FIG. 21 shows a perspective view of the first endplate installed in the shell housing of the filtration system of FIG. 17.

Accordingly, since the filter element 1710 is an authorized filter element, the first endplate 1712 can be received in the shell housing 1708 as shown in the filtration system 1700 of FIG. 21. When the filter element 1710 is installed in the shell housing 1708, the undulated wall 1910 of the first endplate 1712 meshes with the undulated wall 1808 of the shell housing 1708 such that the first endplate 1712 (and thus the filter element 1710) cannot be rotated with respect to the shell housing 1708. Further, when the filter element 1710 is installed in the shell housing 1708, the first endplate 1712 and the shell housing 1708 form a U-shaped channel that receives the outer seal member 122. The outer seal member 122 is supported by the outer gasket retaining wall 2006, the outer gasket retaining lip 1922, the gasket retaining wall 1804, and the gasket retaining lip 1806. When the filter element 1710 is installed in the filtration system 1700, the outer seal member 122 will undergo compression as it is pressed between a filter housing component (e.g., filter mounting head) and the U-shaped channel that causes the outer seal member 122 to press against the walls of the U-shaped channel and the filter housing component. In some arrangements, the walls of the U-shaped channel are at least two-thirds the height of the outer seal member 122.

If a technician attempts to insert a non-authorized filter element into the shell housing 1708 (e.g., a filter element that does not include a first endplate having the undulated wall 1910), the non-authorized filter element will not fit in the shell housing 1708. For example, a first endplate of a non-authorized filter element will not slide all the way in to the shell housing 1708 because the pattern of the undulated wall 1808 prevents the unauthorized first endplate from sliding into the shell housing 1708. Accordingly, the non-authorized filter element is raised from a fully installed position by the height of the undulated wall 1808, and sits above the top of the undulated wall 1808 by the height of the unauthorized first endplate. The height is sufficiently large to allow the unauthorized first endplate to protrude above the top surface 1802 of the shell housing 1708. Since the unauthorized first endplate is raised, the unauthorized first endplate comes into contact with a filter mounting head before the threaded connection between the shell housing 908 and the filter mounting head is engaged (and before any seals form between the unauthorized first endplate and the filter mounting head), which prevents the unauthorized filter element from being installed in the filtration system 1700. If a filter element is not installed in the filtration system 1700, any corresponding system associated with the filtration system 1700 (e.g., an internal combustion engine) may be prevented from starting.

The above described undulating pattern of any of the above described arrangements (e.g., of the undulated walls 308, 410, 1008, 1110, 1508, 1610, 1808, and 1910), can be varied from product to product to designate different characteristics of given filtration systems of filter elements. The difference characteristics may include any combination of media type, filter element service life, application (e.g., on vs. off highway), filter type (e.g., fuel, oil, water, etc.), presence of special components (e.g., coalescing layers, screens, etc.), filter media grade, filter element efficiency or ISO code, filter element stage designation, the presence of sensors, or the like. The undulating pattern can be changed by varying the shape of the pattern (e.g., rounded flower petals, jagged teeth, geometric shapes, etc.), the frequency of the pattern (e.g., the number of petals, teeth, etc.), the color of the endplate, the material of the endplate, the size of the entry holes, the number of entry holes, the depth of the pattern, or a combination thereof.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A filter element comprising:
   filter media; and
   a first endplate coupled to the filter media, the first endplate comprising:
   a top surface,
   a bottom surface parallel to and displaced from the top surface,
   an opening passing through the top surface and the bottom surface,
   a first wall positioned between the top surface and the bottom surface and projecting radially outward of the first endplate, the first wall having a pattern comprising a plurality of curved surfaces projecting radially outwards of the end plate and a plurality of indents located between each of the plurality of curved surfaces and projecting radially inwards into the first wall such that the pattern defines an outer circumferential uneven surface structured to mesh with a matching pattern formed on an inner surface of a shell housing when the filter element is installed in the shell housing, an upper surface of the first wall defining a gasket retaining lip, a lower surface of the first wall defining a housing support lip, the gasket retaining lip and the housing support lip each having a variable outer radius that matches a profile of the outer circumferential uneven surface, the housing support lip being a planar surface that is continuous along an entire perimeter of the first endplate, and
   a gasket retaining wall engaged with and extending axially away from the gasket retaining lip, the gasket retaining wall at least partially defining the opening.

2. The filter element of claim 1, wherein the gasket retaining wall is oriented perpendicular to the top surface, the gasket retaining lip parallel to the top surface, the gasket retaining lip connecting the first wall and the gasket retaining wall, the gasket retaining lip and the gasket retaining wall forming a first portion of a U-shaped channel that is configured to axially receive an outer seal member.

3. The filter element of claim 2, wherein the first endplate further comprises an inner gasket retaining lip, a first gasket retaining wall, and a second gasket retaining wall, the first gasket retaining wall and the second gasket retaining wall perpendicular to the top surface and spaced inward from the gasket retaining wall, the inner gasket retaining lip and first gasket retaining wall and the second gasket retaining wall forming a second U-shaped channel that receives an inner seal member.

4. The filter element of claim 3, the endplate further defining at least one inlet, wherein a first space is defined between the outer seal member and the inner seal member, the first space in fluid communication with the at least one inlet, and wherein a second space is defined inside of the inner seal member, the second space in fluid communication with the opening.

5. A filtration system comprising:
   a filter mounting head having a fluid inlet and a fluid outlet;
   a shell housing removably coupled to the filter mounting head through a threaded connection, the shell housing defining a central compartment, the shell housing including a second wall having the matching pattern; and
   the filter element of claim 1 positioned within the central compartment such that first wall meshes with the second wall.

6. The filtration system of claim 5, wherein filter element is rotationally locked with respect to the shell housing.

7. The filtration system of claim 5, wherein the first endplate is inscribed with the pattern.

8. The filtration system of claim 5, wherein the first endplate circumscribes the pattern.

9. The filtration system of claim 5, wherein the first endplate includes a raised tab extending from a top surface of the first endplate, the raised tab received in a circular channel of the filter mounting head.

10. The filtration system of claim 5, further comprising an outer seal member axially engaging both the gasket retaining lip and an upper surface of the second wall.

11. The filtration system of claim 1, wherein each of the plurality of indents defines a curved axial notch in between and connecting two of the plurality of curved surfaces.

12. The filtration system of claim 1, wherein the gasket retaining rip and the gasket retaining wall together define a portion of a U-shaped channel, the filtration system further comprising an axial seal member disposed in the portion of the U-shaped channel so that the gasket retaining lip engages the axial seal member along an entire outer perimeter of the gasket retaining lip.

13. The filtration system of claim 12, wherein the gasket retaining lip defines a radially non-uniform support surface for the axial seal member.

* * * * *